US005945242A

United States Patent [19]

Taniguchi et al.

[11] Patent Number: 5,945,242

[45] Date of Patent: Aug. 31, 1999

[54] ELECTROPHOTOGRAPHIC PHOTORECEPTOR CONTAINING HYDRAZONE

[75] Inventors: Tomoko Taniguchi; Tatsuya Kodera, both of Tokyo, Japan

[73] Assignee: Mitsubishi Paper Mills Limited, Tokyo, Japan

[21] Appl. No.: 08/946,346

[22] Filed: Oct. 7, 1997

[51] Int. Cl.[6] .......... G03G 5/047

[52] U.S. Cl. .......... 430/59; 430/56; 430/74

[58] Field of Search .......... 430/59, 56, 74

[56] References Cited

U.S. PATENT DOCUMENTS 4,465,857 8/1984 Naumann et al. .

4,594,304 6/1986 Watarai et al. .......... 430/59

5,009,976 4/1991 Itoh et al. .

*Primary Examiner*—Christopher D. Rodee

*Attorney, Agent, or Firm*—Pillsbury Madison & Sutro LLP

[57] ABSTRACT

Disclosed is an electrophotographic photoreceptor having a high sensitivity, a high endurance and a high stability against repeated use which comprises a conductive support with a light-sensitive layer containing one or more hydrazone compounds represented by the following formula (I):

(I)

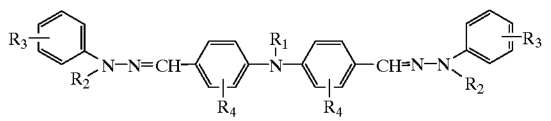

wherein $R_1$ represents an alkyl group of 5 or more carbon atoms, $R_2$ represents a substituted or unsubstituted alkyl group, alkenyl group, aralkyl group, aryl group or heterocyclic group, and $R_3$ and $R_4$ each represent a hydrogen atom, an alkyl group, an alkoxy group or a halogen atom.

5 Claims, No Drawings

ELECTROPHOTOGRAPHIC PHOTORECEPTOR CONTAINING HYDRAZONE

FIELD OF THE INVENTION

The present invention relates to an electrophotographic photoreceptor characterized by containing a specific hydrazone compound.

BACKGROUND OF THE INVENTION

Hitherto, as photoconductive materials of photoreceptors used in electrophotography, inorganic substances such as, for example, selenium, cadmium sulfide, zinc oxide and silicon have been known, and extensively studied and practically utilized. These inorganic substances have many advantages, but also have various defects. For example, selenium has the defects that the production thereof is difficult and it readily crystallizes with heat or mechanical shock, and cadmium sulfide and zinc oxide have problems in moisture resistance and endurance. Silicon is said to have difficulties in chargeability and in production thereof. In addition, selenium and cadmium sulfide have a problem of toxicity.

On the other hand, organic photoconductive materials have the advantages of better film-forming ability and flexibility, lighter weight, higher transparency, and easier design of photoreceptors for wide wavelength region using proper sensitizing methods. Thus, they are increasingly attempted to put to practical use.

Fundamental properties required for photoreceptors used in electrophotography are (1) high chargeability when exposed to corona discharge in the dark, (2) less leakage, in the dark, of the charge obtained (decay in the dark), (3) rapid release of the charge when exposed to light (decay with light), and (4) little residual charge after exposure to light.

Many researches have been conducted on photoconductive polymers such as polyvinylcarbazole to be used as organic photoconductive substances. These compounds, however, are not satisfactory in film-forming properties, flexibility and adhesiveness and, besides, are difficult to fully satisfy the above mentioned fundamental requirements.

As for organic low molecular photoconductive compounds, photoreceptors excellent in mechanical strength such as flexibility and in film-forming properties and adhesiveness can be obtained by selecting binders used for the formation of photoreceptors, but it has been difficult to find compounds suitable to produce photoreceptors capable of maintaining high sensitivity.

In order to improve these problems, organic photoreceptors of higher sensitivity have been developed in which charge generation function and charge transport function are performed by separate substances. The feature of this so-called function-separated type photoreceptors is that substances suitable for the respective functions can be selected from a wide variety of substances and photoreceptors having optional performances can be easily produced. For this reason, many researches have been made thereon.

Various substances such as phthalocyanine, squarylium dyes, azo pigments, perylene pigments and others have been studied as substances which perform charge generating function. Among them, azo pigments can have various molecular structures and can be expected to give a high charge generating efficiency, and have been widely studied and gradually put to practical use. However, the relation between molecular structure and charge generating efficiency has not yet been clarified, and at present, a great number of studies on synthesis have been conducted to search for the optimum structures.

On the other hand, substances which perform charge transporting function include hole transport substances and electron transport substances. Various substances such as hydrazone compounds and stilbene compounds have been studied as the former substances, and 2,4,7-trinitro-9-fluorenone, diphenoquinone derivatives, and others have been studied as the latter substances, and these are attempted to put to practical use. Also as to these substances, a great number of studies on synthesis have been conducted to search for the optimum structures. In fact, various improvements have been made, but those which satisfy the fundamental properties required as photoreceptors mentioned above and have high endurance have not yet been obtained.

As mentioned above, various improvements have been made in production of electrophotographic photoreceptors, but, at present, those which satisfy the fundamental properties required as photoreceptors mentioned above and have high endurance have not yet been obtained.

SUMMARY OF THE INVENTION

The object of the present invention is to provide electrophotographic photoreceptors which are high in sensitivity, high in charging potential, undergo substantially no decrease in sensitivity even after repeated use, and are stable in charging potential.

DESCRIPTION OF THE INVENTION

The inventors have conducted researches on photoconductive substances having high sensitivity and high endurance and, as a result, have found that hydrazone compounds represented by the following formula (I) are effective. Thus, the present invention have been accomplished.

(I)

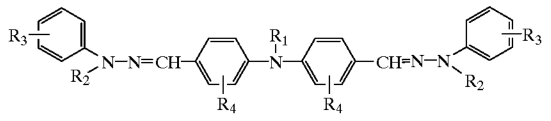

In the above formula (I), $R_1$ represents an alkyl group of 5 or more carbon atoms, $R_2$ represents a substituted or unsubstituted alkyl group, aralkyl group, aryl group or heterocyclic group, and $R_3$ and $R_4$ each represent a hydrogen atom, an alkyl group, an alkoxy group or a halogen atom.

Examples of $R_1$ are alkyl groups such as pentyl group, isopentyl group, neopentyl group, t-pentyl group, n-hexyl group, n-heptyl group, n-octyl group, dodecyl group, hexadecyl group, octadecyl group, and the like.

Examples of $R_2$ are alkyl groups such as methyl group, ethyl group, isopropyl group, butyl group, and the like, aralkyl groups such as benzyl group, β-phenylethyl group, α-naphthylmethyl group, and the like, aryl groups such as phenyl group, naphthyl group, anthryl group, and the like, and heterocyclic groups such as pyridyl group, furyl group, thienyl group, and the like. Substituents on these groups include, for example, halogen atoms, amino groups such as dimethylamino group and diphenylamino group, hydroxyl group, carboxyl group which may be esterified, cyano group, alkyl groups such as methyl group, ethyl group, propyl group, isopropyl group, n-butyl group, t-butyl group, and trifluoromethyl group, alkoxy groups such as methoxy group, ethoxy group, propoxy group and n-butoxy group, alkylthio groups such as methylthio group, ethylthio group and phenylthio group, and the like.

Examples of $R_3$ and $R_4$ are respectively hydrogen atom, alkyl groups such as methyl group, ethyl group, propyl group, isopropyl group, butyl group, t-butyl group and trifluoromethyl group, alkoxy groups such as methoxy group, ethoxy group, propoxy group and butoxy group, and halogen atoms such as fluorine atom, chlorine atom, bromine atom and iodine atom.

Furthermore, the inventors have found that the hydrazone compounds represented by the formula (I) where $R_1$ is an alkyl group of 5–8 carbon atoms are especially effective. It has been also found that those of the formula (I) where $R_1$ is n-hexyl group are especially preferred. Moreover, among them, the compound of the formula (I) where $R_1$ is n-hexyl group, $R_2$ is methyl group, and $R_3$ and $R_4$ are both hydrogen atoms shows the highest characteristics.

Examples of hydrazone compounds represented by the formula (I) used in the present invention include those of the following structural formulas. These are not limiting the invention.

(1)

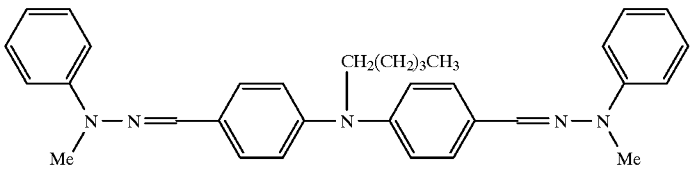

(2)

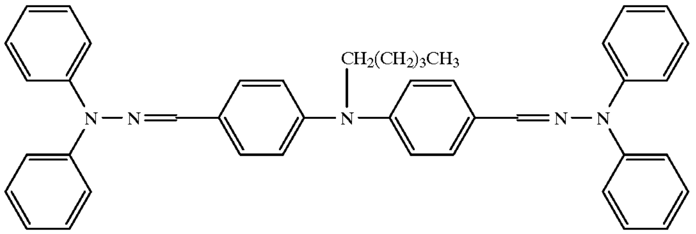

(3)

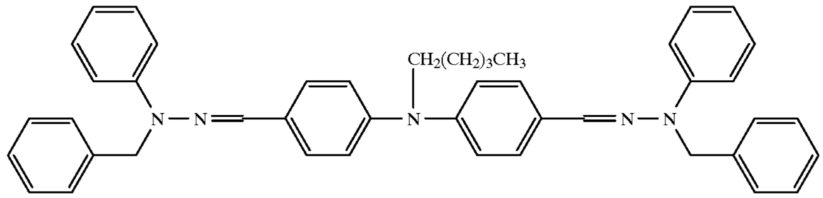

(4)

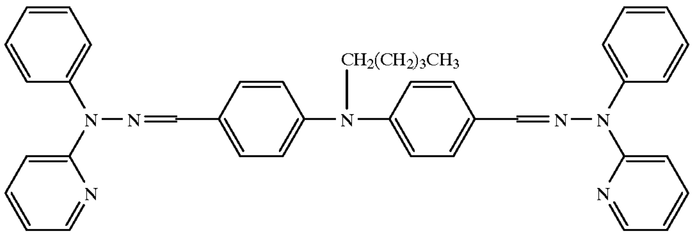

(5)

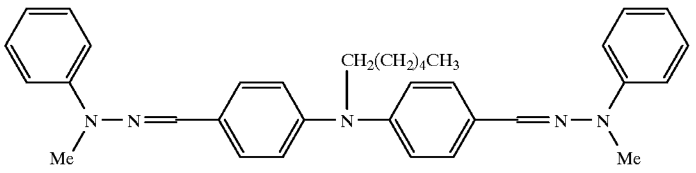

(6)

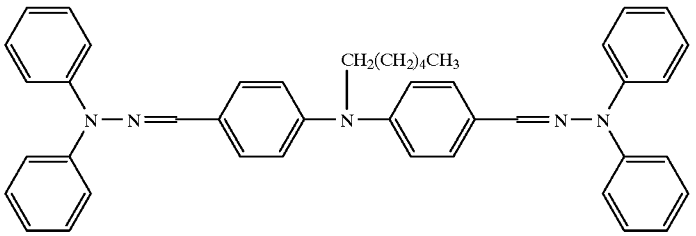

-continued
(7)
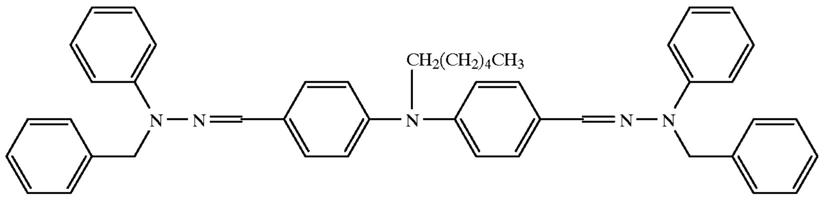
(8)
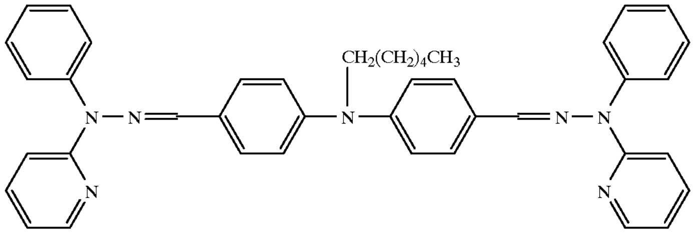
(9)
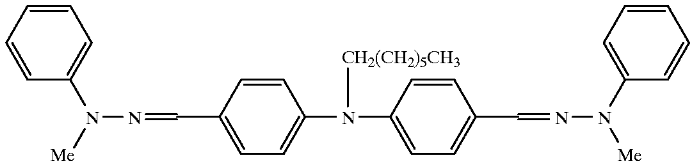
(10)
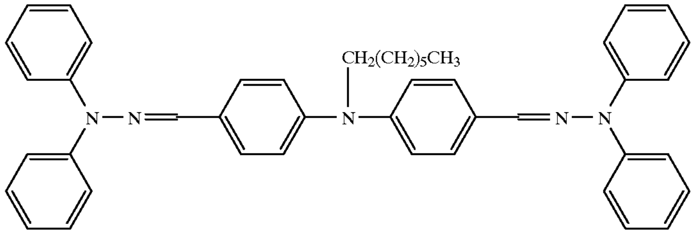
(11)
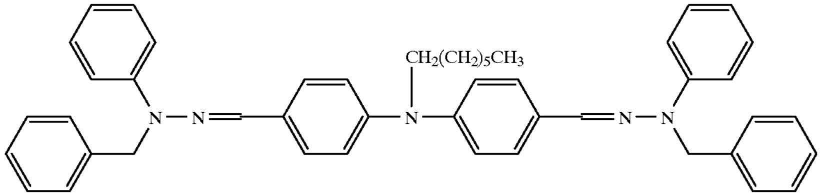
(12)
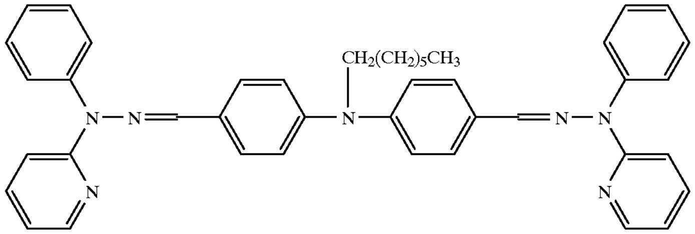
(13)
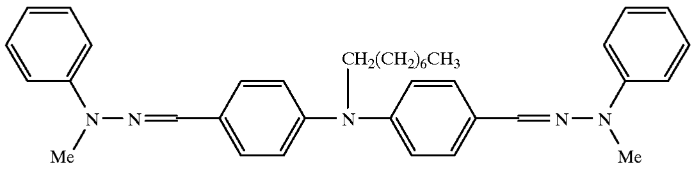

-continued
(14)
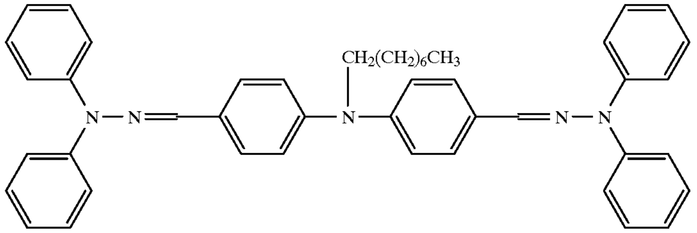
(15)
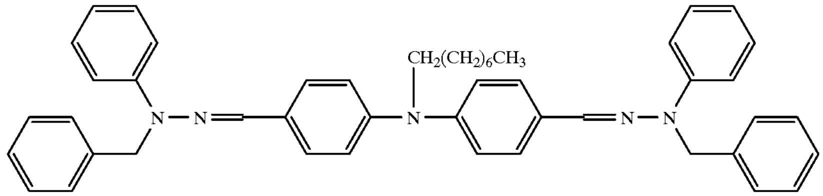
(16)
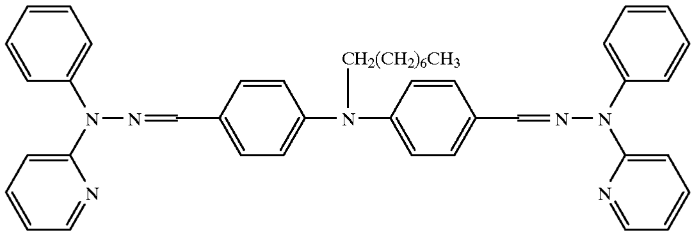
(17)
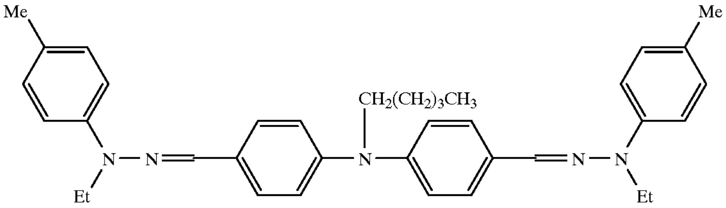
(18)
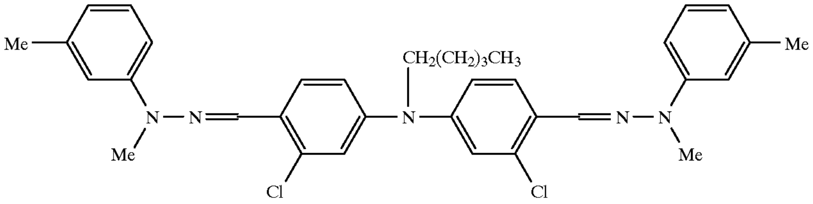
(19)
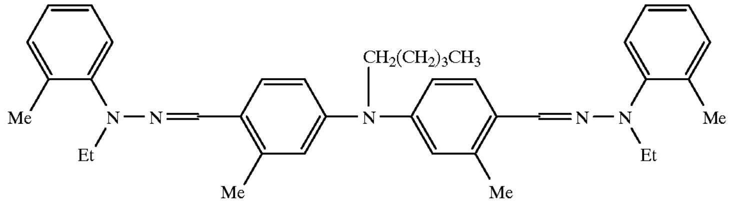
(20)
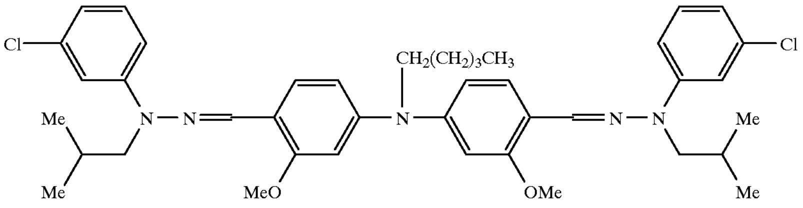

-continued
(21)
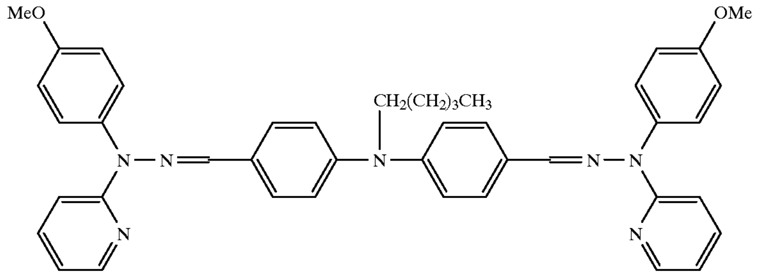
(22)
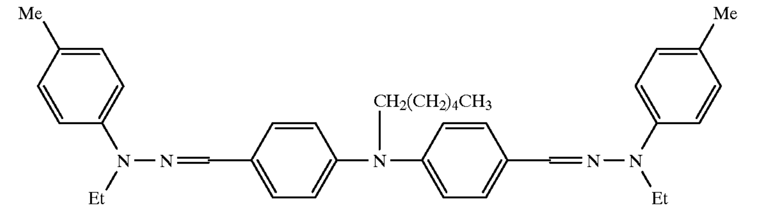
(23)
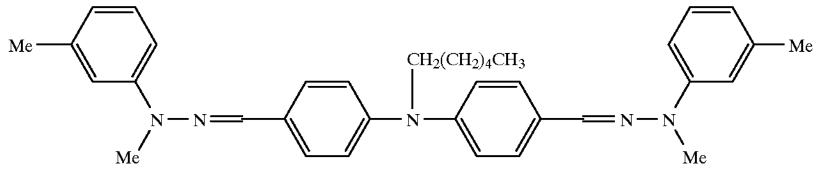
(24)
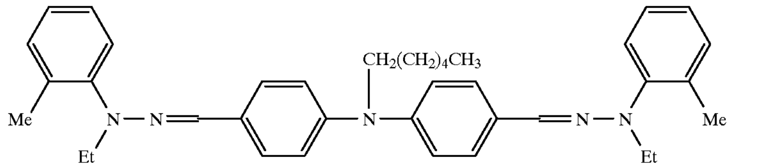
(25)
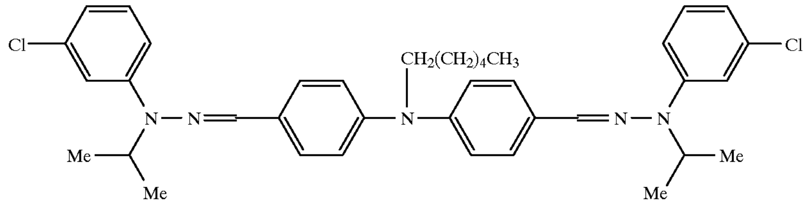
(26)
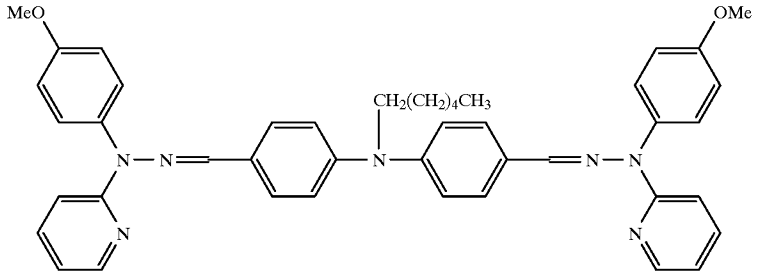
(27)
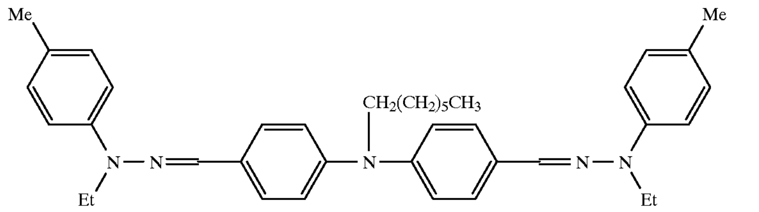

-continued
(28)
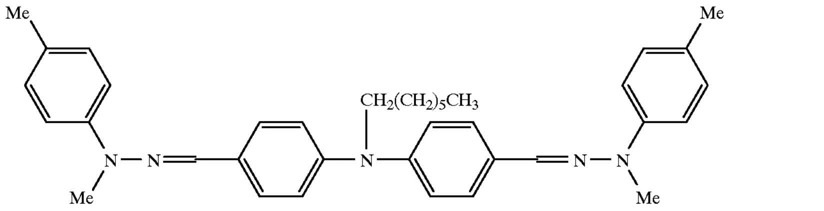
(29)
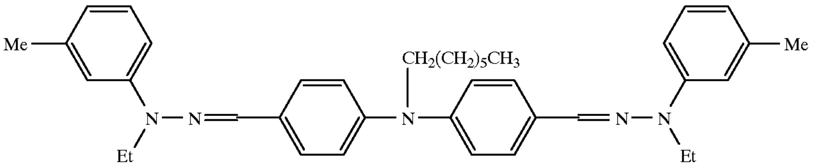
(30)
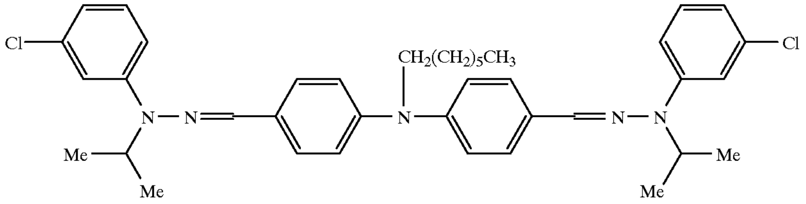
(31)
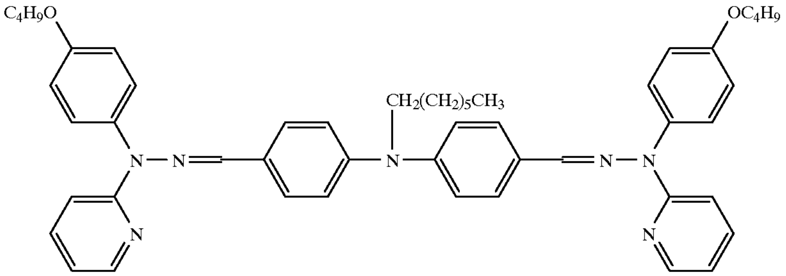
(32)
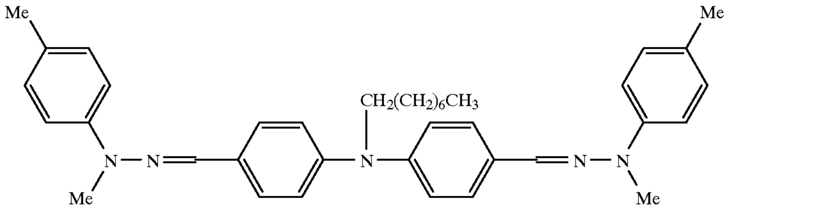
(33)
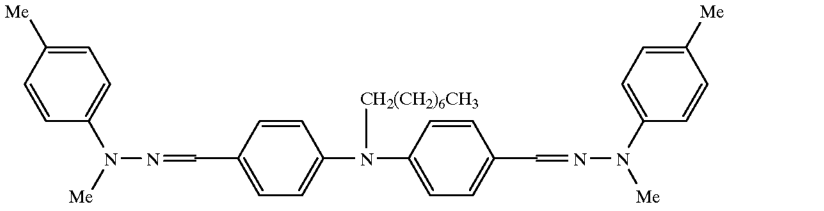
(34)
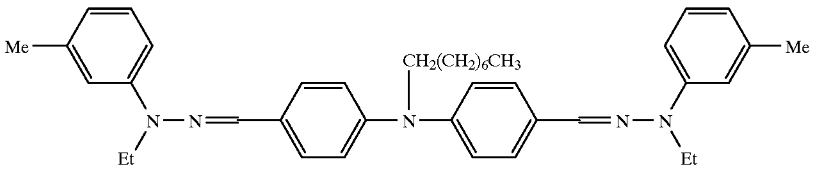

-continued (35)

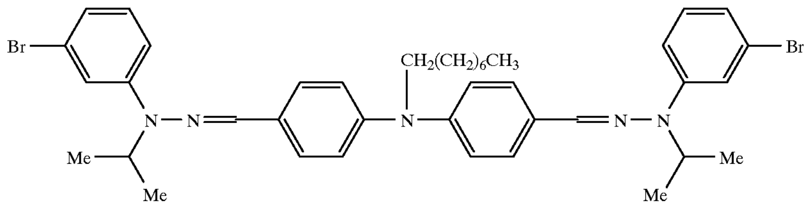

(36)

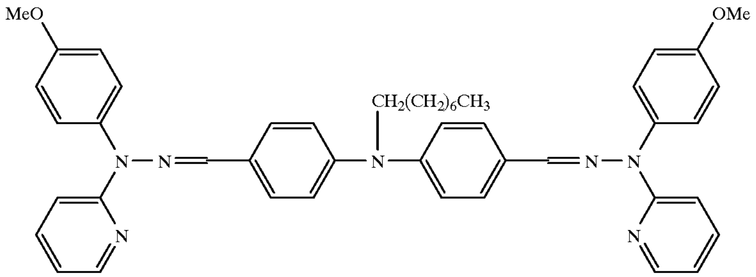

(37)

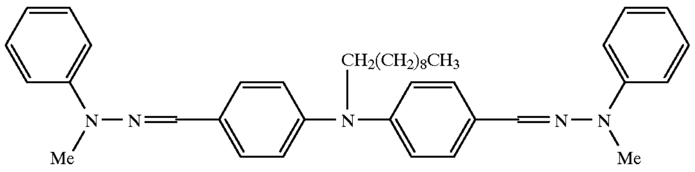

(38)

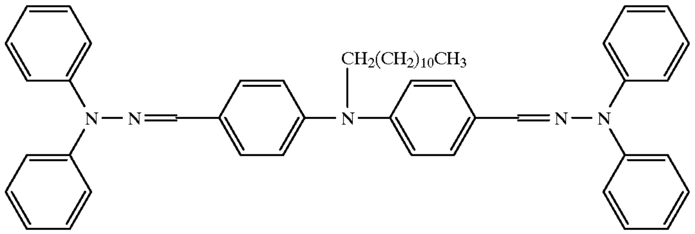

(39)

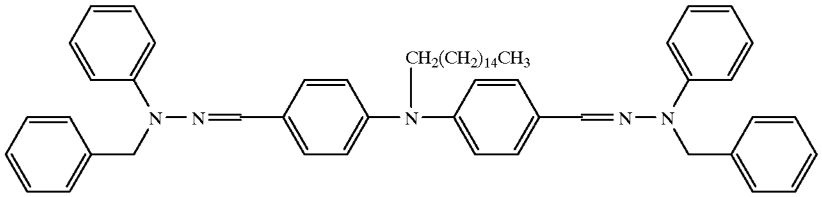

(40)

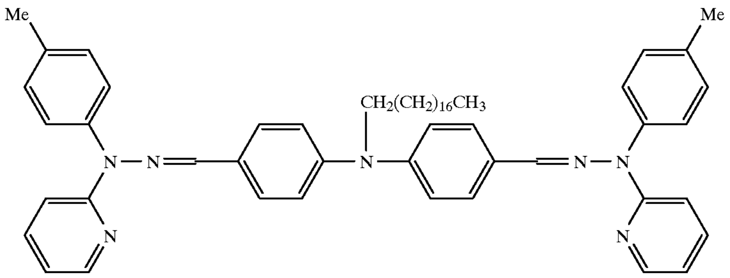

The electrophotographic photoreceptors of the present invention are obtained by containing one or more of the hydrazone compounds represented by the formula (I) and one or more of charge generation substances. As the charge generation substances, there may be used metals or its salts such as, for example, selenium and cadmium sulfide, phthalocyanine compounds, perylene compounds, azo compounds, and the like. Examples of the azo compounds are those which are described in JP-A-47-37543, JP-A-53-95033, JP-A-53-132347, JP-A-53-133445, JP-A-54-12742, JP-A-54-20736, JP-A-54-20737, JP-A-54-21728, JP-A-54-22834, JP-A-55-69148, JP-A-55-69654, JP-A-55-79449, JP-A-55-117151, JP-A-56-46237, JP-A-56-116039, JP-A-56-116040, JP-A-56-119134, JP-A-56-143437, JP-A-57-63537, JP-A-57-63538, JP-A-57-63541, JP-A-57-63542, JP-A-57-63549, JP-A-57-66438, JP-A-57-74746, JP-A-57-78542, JP-A-57-78543, JP-A-57-90056, JP-A-57-90057, JP-A-57-90632, JP-A-57-116345, JP-A-57-202349, JP-A-58-4151, JP-A-58-90644, JP-A-58-144358, JP-A-58-177955, JP-A-59-31962, JP-A-59-33253, JP-A-59-71059, JP-A-59-72448, JP-A-59-78356, JP-A-59-136351, JP-A-59-201060, JP-A-60-15642, JP-A-60-140351, JP-A-60-179746, JP-A-61-11754, JP-A-61-90164, JP-A-61-90165, JP-A-61-90166, JP-A-61-112154, JP-A-61-281245, JP-A-61-51063, JP-A-62-267363, JP-A-63-68844, JP-A-63-89866, JP-A-63-139355, JP-A-63-142063, JP-A-63-183450, JP-A-63-282743, JP-A-64-21455, JP-A-64-78259, JP-A-1-200267, JP-A-1-202757, JP-A-1-319754, JP-A-2-72372, JP-A-2-254467, JP-A-3-278063, JP-A-4-96068, JP-A-4-96069, JP-A-4-147265, JP-A-5-142841, JP-A-5-303226, JP-A-6-324504, and JP-A-7-168379.

Coupler components used for these azo compounds are of wide variety of structures. As examples thereof, mention may be made of the compounds disclosed in JP-A-54-17735, JP-A-54-79632, JP-A-57-176055, JP-A-59-197043, JP-A-60-130746, JP-A-60-153050, JP-A-60-103048, JP-A-60-189759, JP-A-63-131146, JP-A-63-155052, JP-A-2-110569, JP-A-4-149448, JP-A-6-27705, and JP-A-6-348047.

Examples of the azo compounds are enumerated in the following tables, but these are not limiting the invention. Other charge generation substances can be used in combination with these compounds.

TABLE 1

| | |
|---|---|
| | 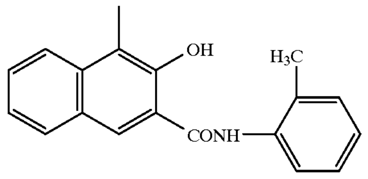 |
| 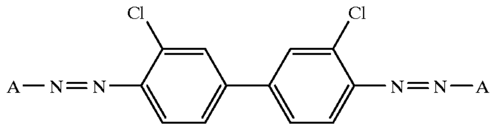 | A-1 |
| 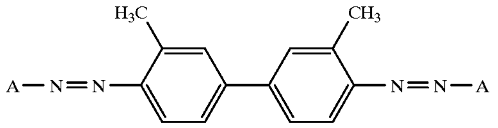 | B-1 |
| 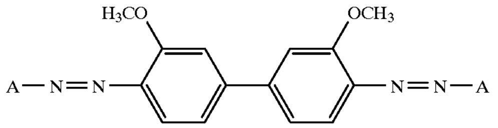 | C-1 |
| 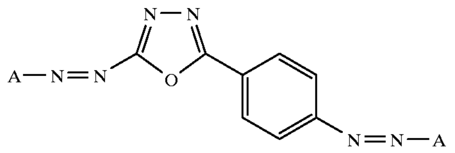 | D-1 |
| 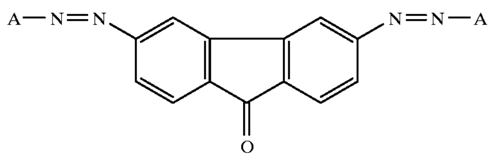 | E-1 |
| 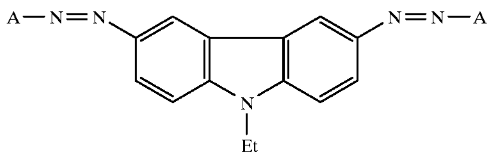 | F-1 |

TABLE 1-continued
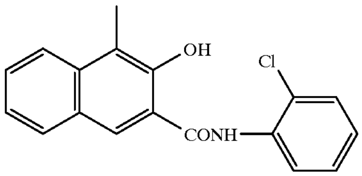
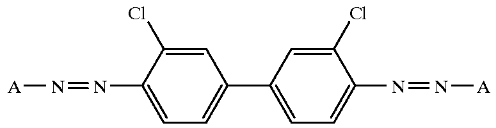
A-2
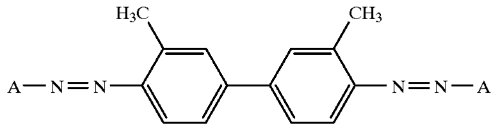
B-2
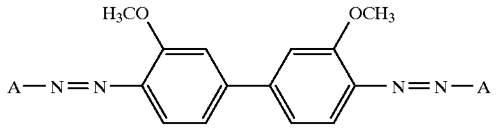
C-2
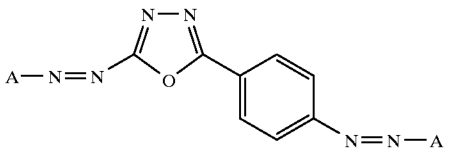
D-2
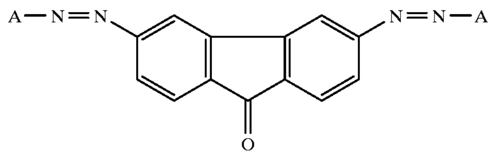
E-2
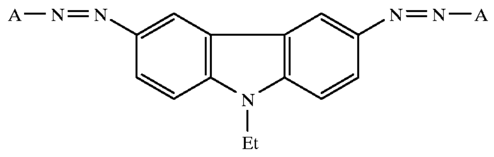
F-2
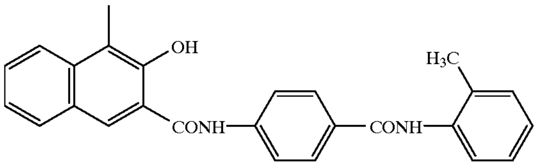
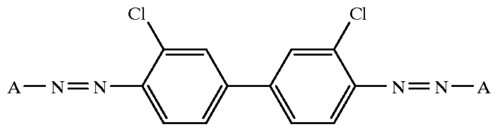
A-3

TABLE 1-continued
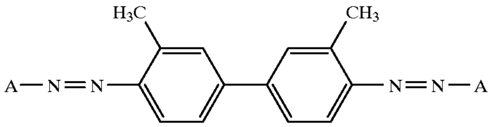
B-3
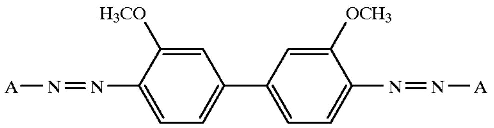
C-3
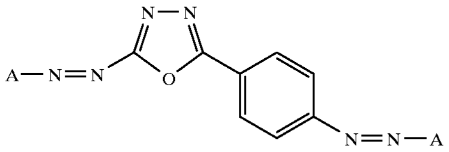
D-3
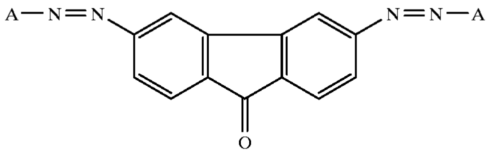
E-3
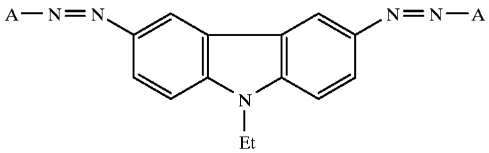
F-3
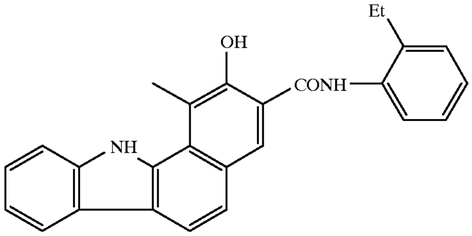
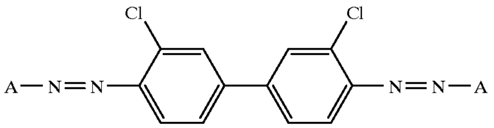
A-4
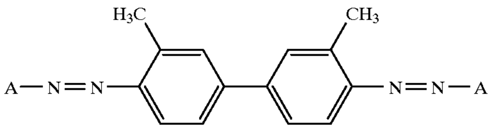
B-4
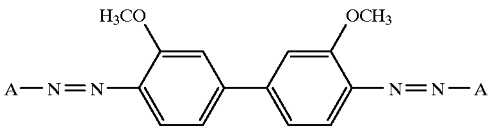
C-4

TABLE 1-continued
| | |
|---|---|
| 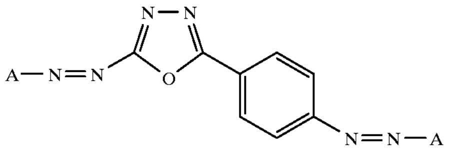 | D-4 |
| 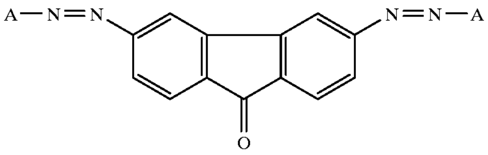 | E-4 |
| 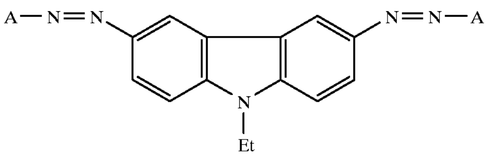 | F-4 |
TABLE 2
| 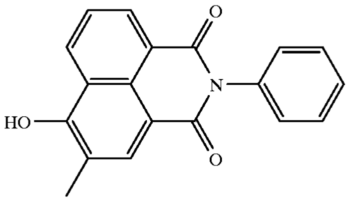 | |
|---|---|
| 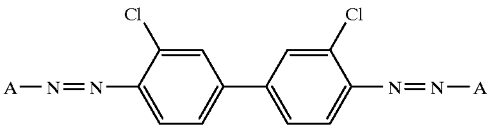 | A-5 |
| 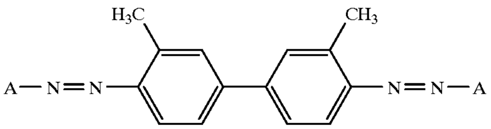 | B-5 |
| 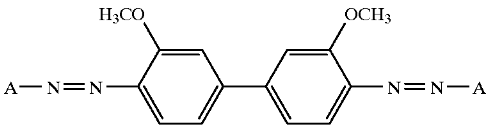 | C-5 |
| 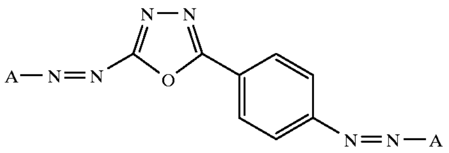 | D-5 |
| 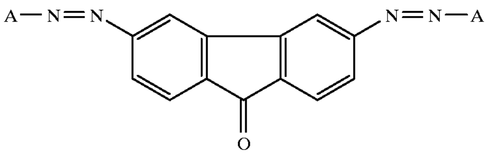 | E-5 |

TABLE 2-continued
| | |
|---|---|
| 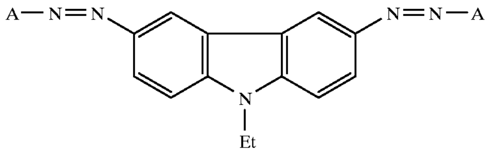 | F-5 |
| | 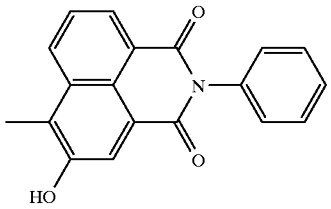 |
| 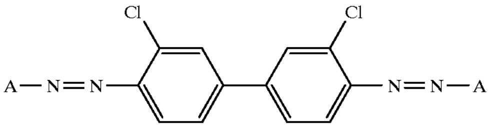 | A-6 |
| 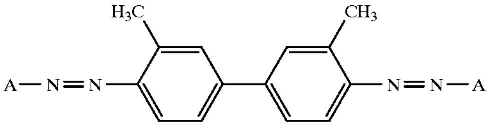 | B-6 |
| 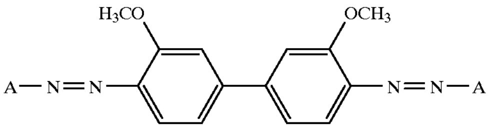 | C-6 |
| 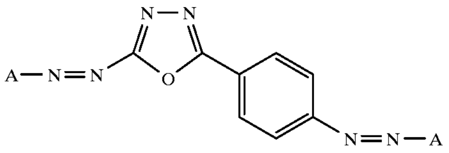 | D-6 |
| 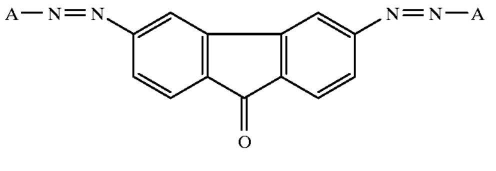 | E-6 |
| 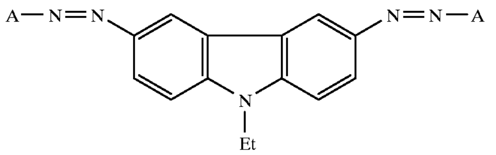 | F-6 |

TABLE 2-continued
| | |
|---|---|
| | 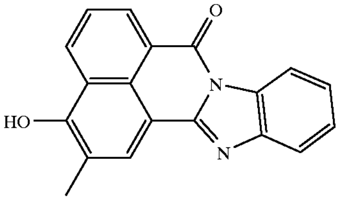 |
| 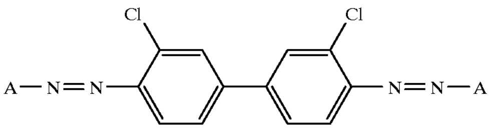 | A-7 |
| 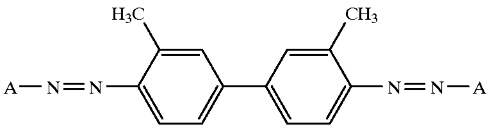 | B-7 |
| 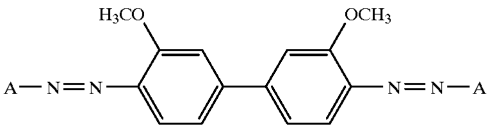 | C-7 |
| 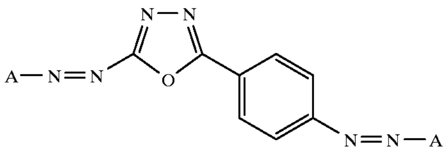 | D-7 |
| 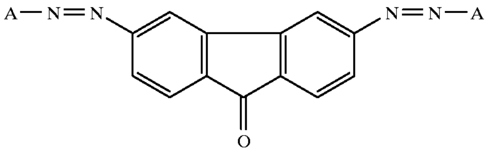 | E-7 |
| 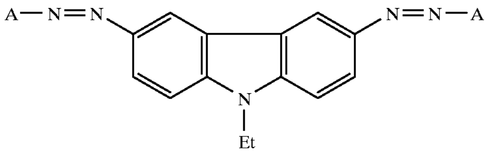 | F-7 |
| | 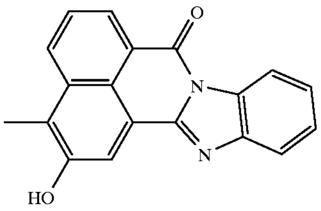 |
| 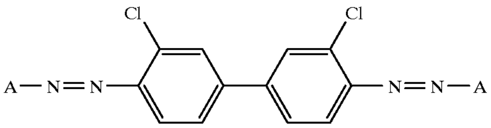 | A-8 |

TABLE 2-continued
| | |
|---|---|
| 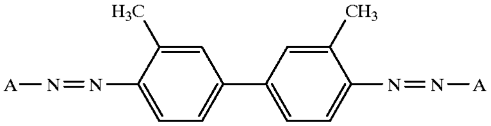 | B-8 |
| 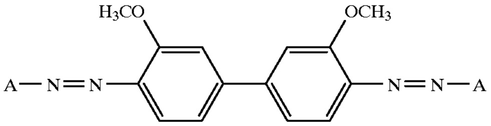 | C-8 |
| 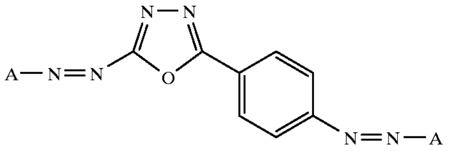 | D-8 |
| 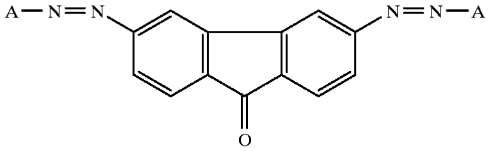 | E-8 |
| 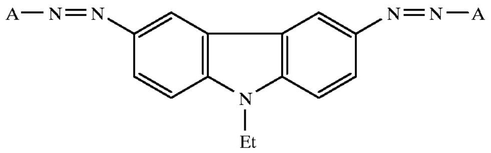 | F-8 |
TABLE 3
| | |
|---|---|
| | 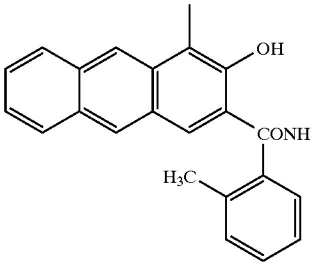 |
| 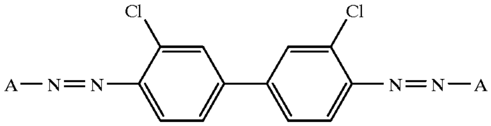 | A-9 |
| 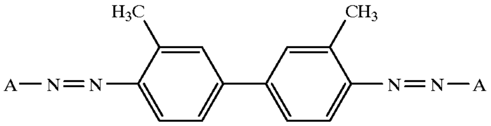 | B-9 |
| 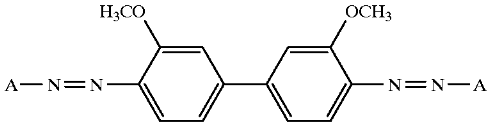 | C-9 |

TABLE 3-continued
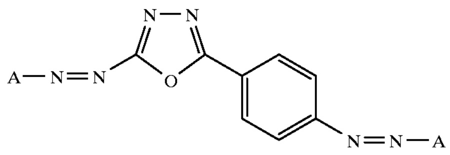
D-9
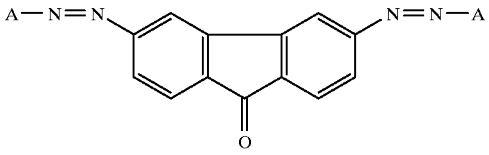
E-9
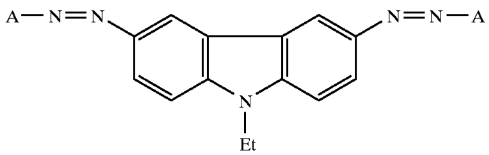
F-9
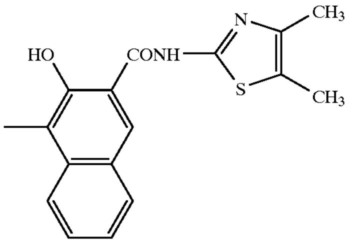
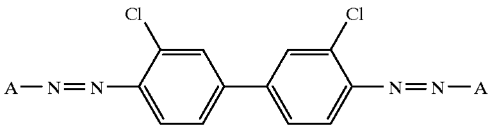
A-10
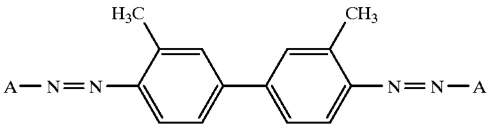
B-10
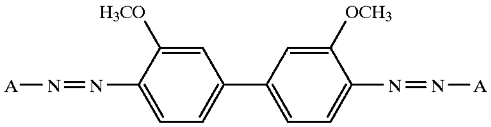
C-10
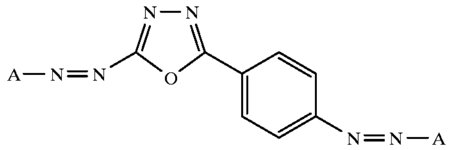
D-10
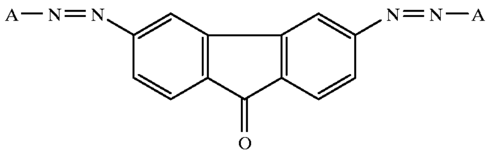
E-10

TABLE 3-continued
| | | |
|---|---|---|
| 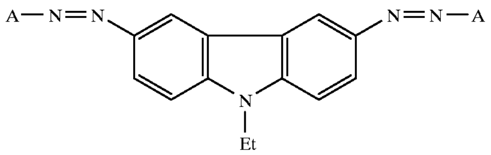 | F-10 | |
| | 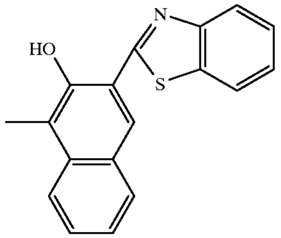 | 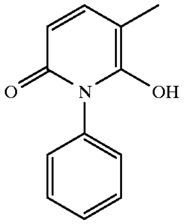 |
| 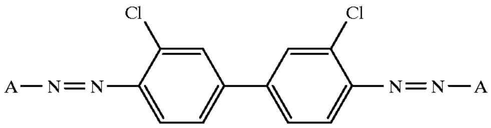 | A-11 | A-12 |
| 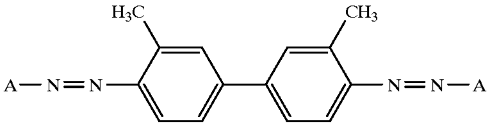 | B-11 | B-12 |
| 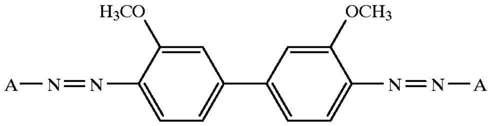 | C-11 | C-12 |
| 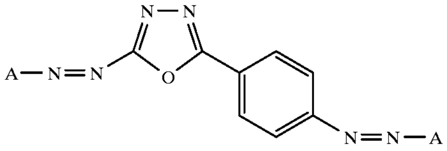 | D-11 | D-12 |
| 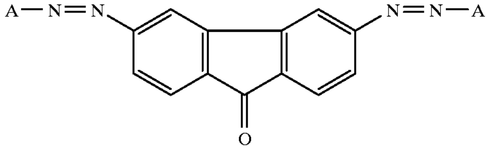 | E-11 | E-12 |
| 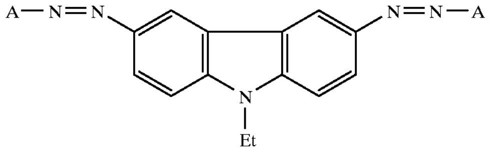 | F-11 | F-12 |

TABLE 4
| | |
|---|---|
| | 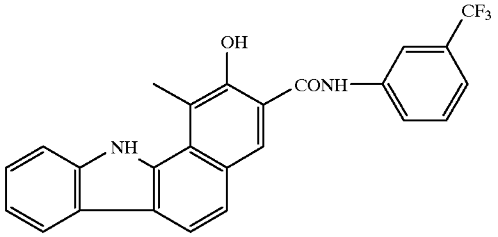 |
| 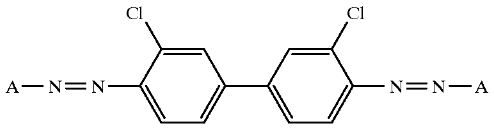 | A-13 |
| 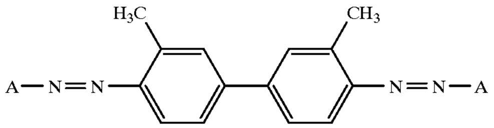 | B-13 |
| 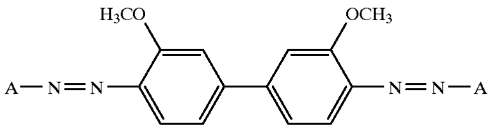 | C-13 |
| 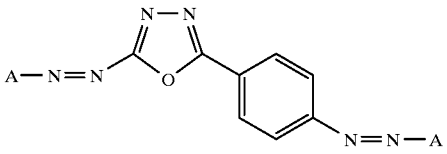 | D-13 |
| 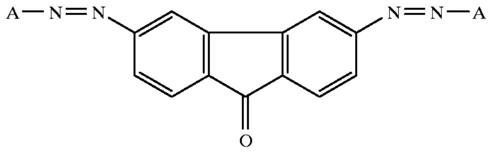 | E-13 |
| 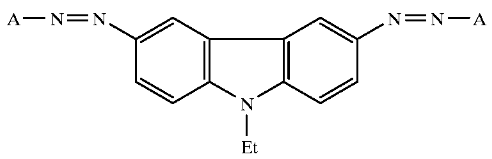 | F-13 |

TABLE 4-continued
| | |
|---|---|
| | 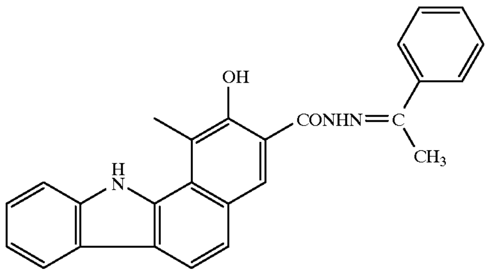 |
| 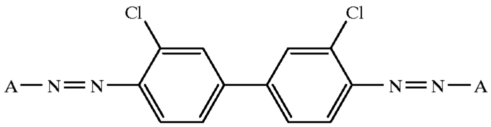 | A-14 |
| 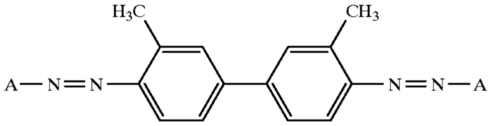 | B-14 |
| 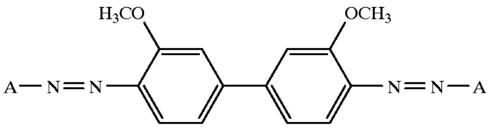 | C-14 |
| 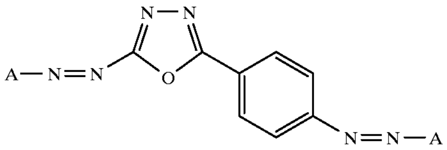 | D-14 |
| 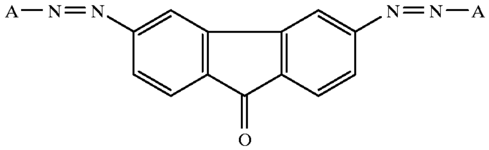 | E-14 |
| 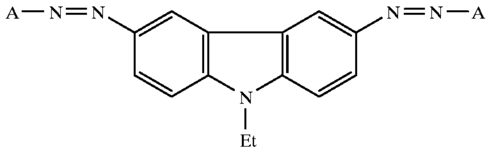 | F-14 |

TABLE 4-continued
| | | |
|---|---|---|
| | 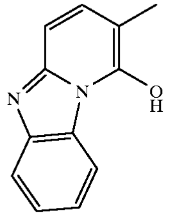 | 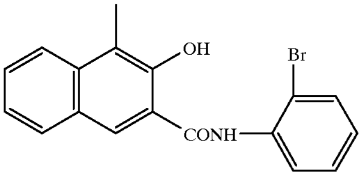 |
| 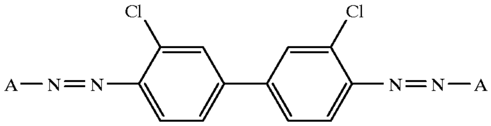 | A-15 | A-16 |
| 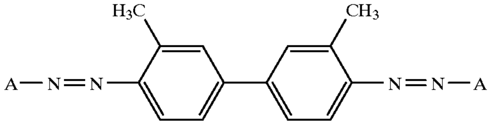 | B-15 | B-16 |
| 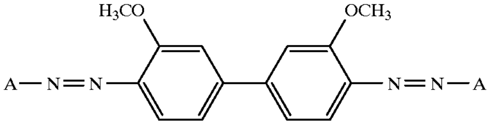 | C-15 | C-16 |
| 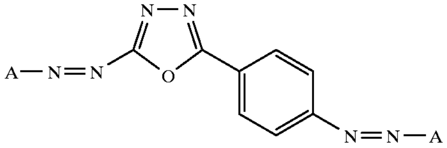 | D-15 | D-16 |
| 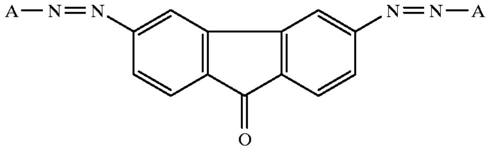 | E-15 | E-16 |
| 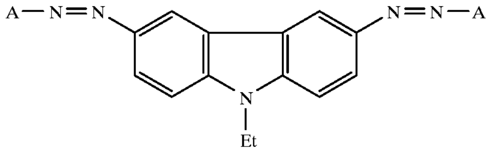 | F-15 | F-16 |

TABLE 5
| | |
|---|---|
| | 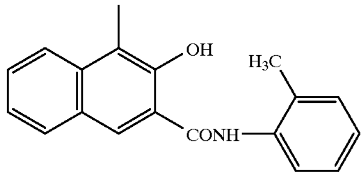 |
| 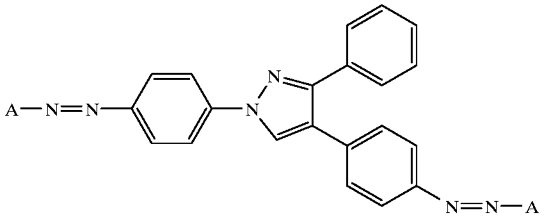 | G-1 |
| 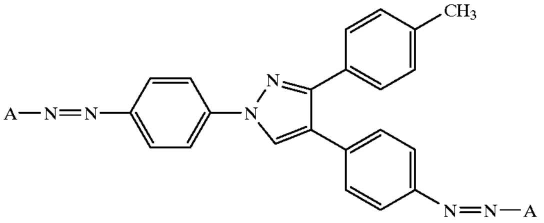 | H-1 |
| 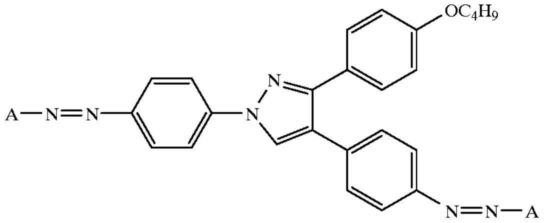 | I-1 |
| 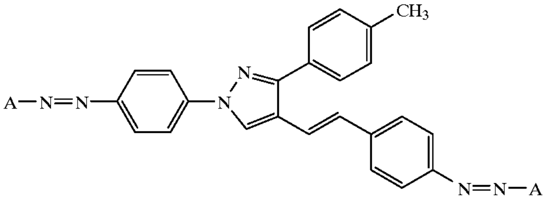 | J-1 |
| 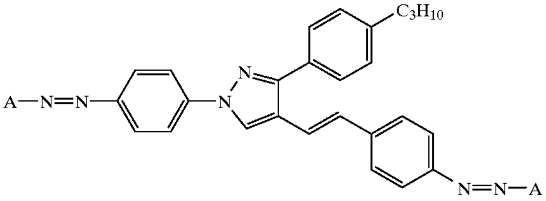 | K-1 |
| 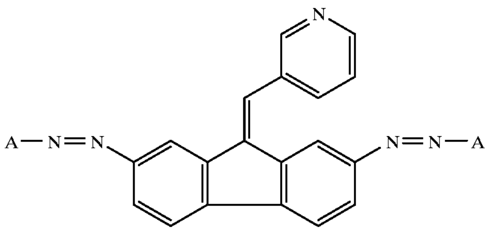 | L-1 |

TABLE 5-continued
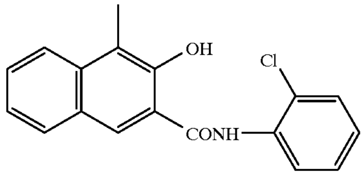
G-2
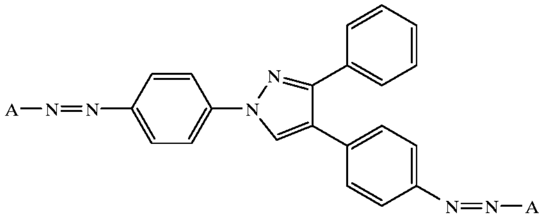
H-2
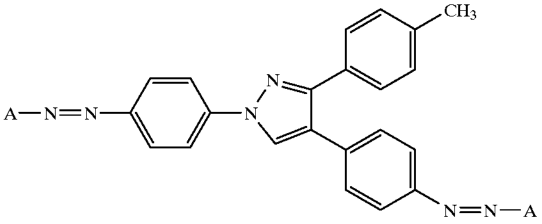
I-2
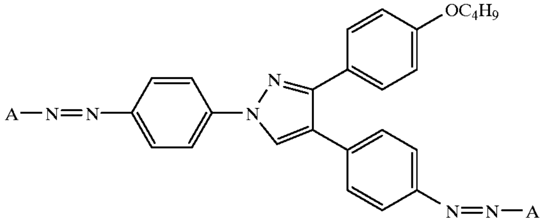
J-2
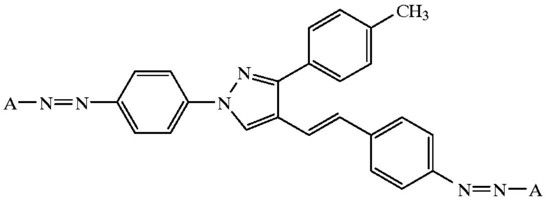
K-2
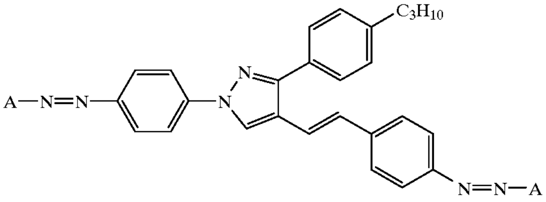
L-2
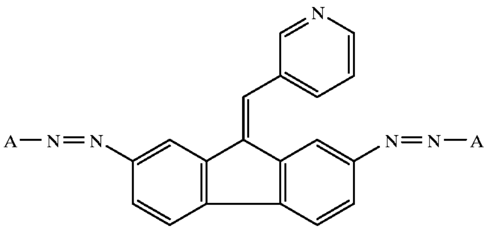

TABLE 5-continued
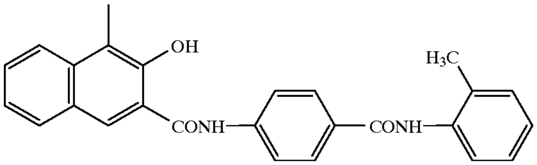
G-3
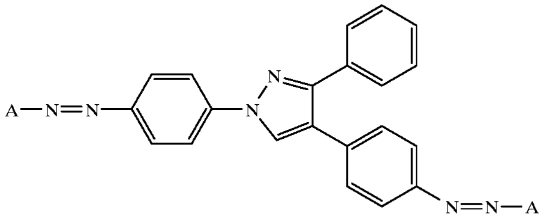
H-3
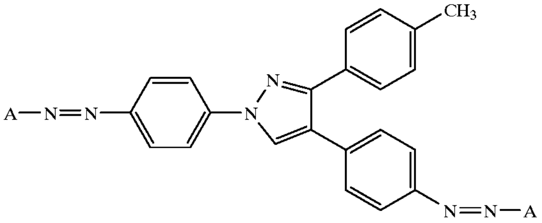
I-3
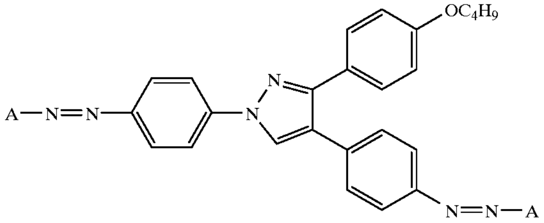
J-3
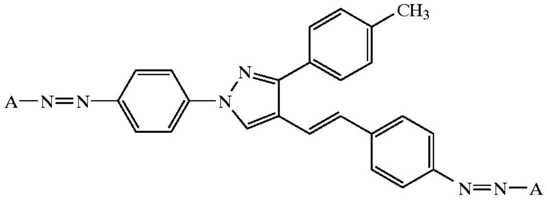
K-3
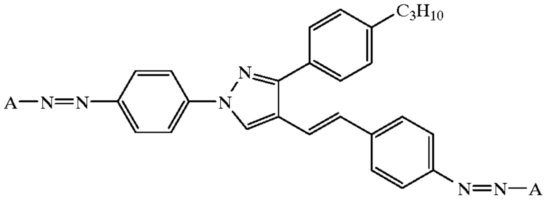
L-3
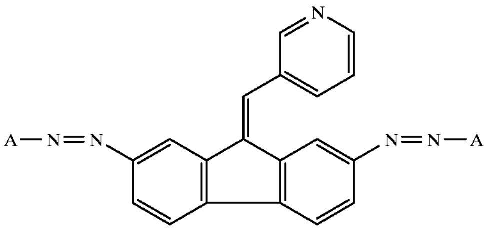

TABLE 5-continued
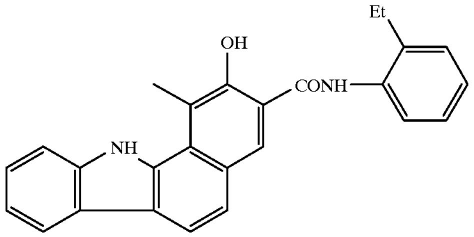
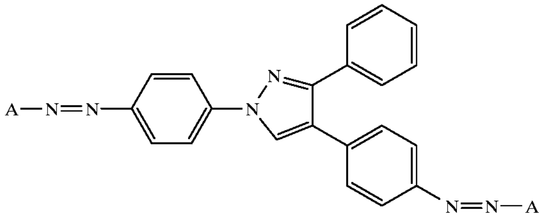
F-4
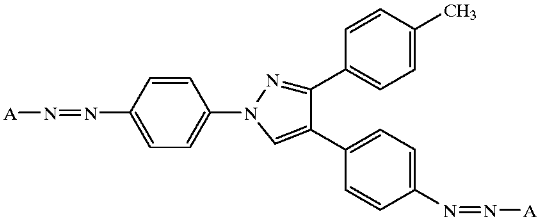
H-4
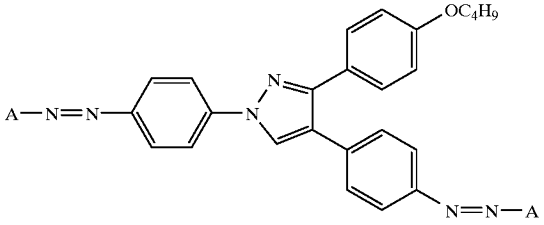
I-4
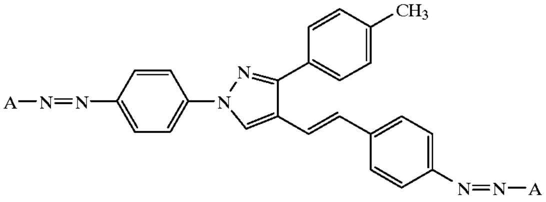
J-4
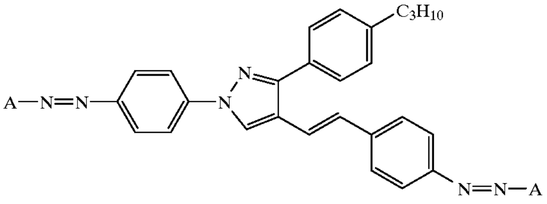
K-4

TABLE 5-continued
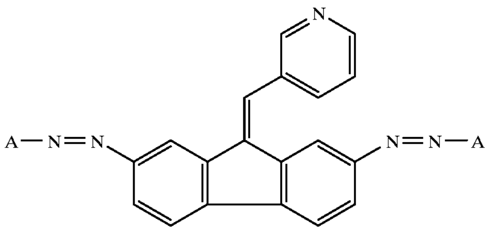
L-4
TABLE 6
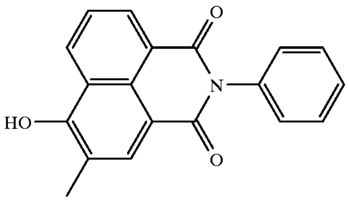
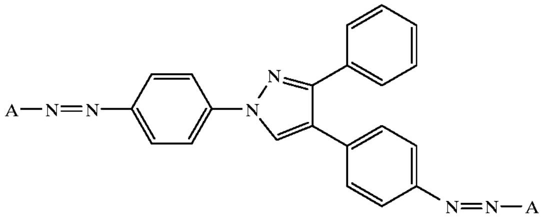
G-5
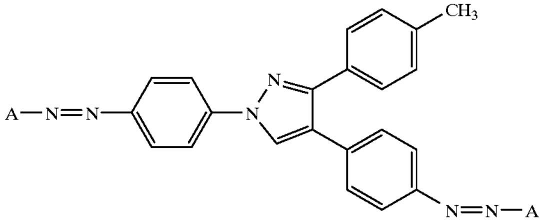
H-5
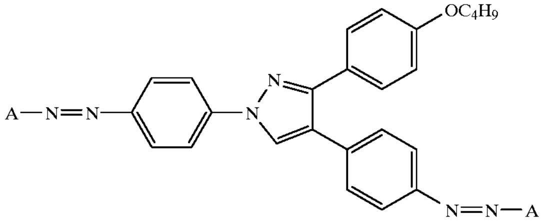
I-5
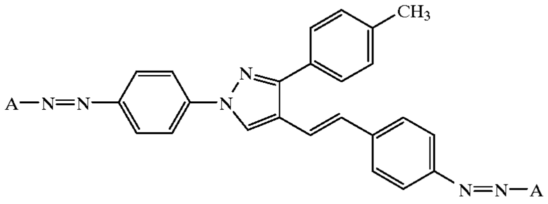
J-5

TABLE 6-continued
| | |
|---|---|
| 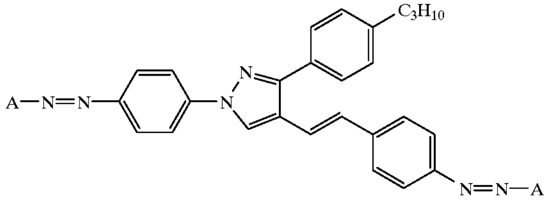 | K-5 |
| 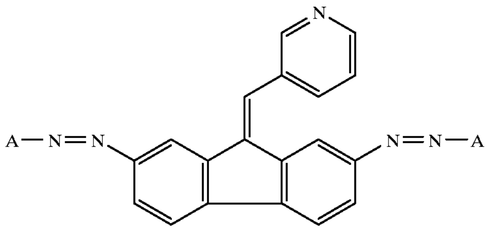 | L-5 |
| | 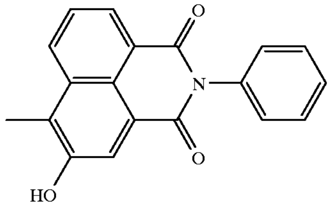 |
| 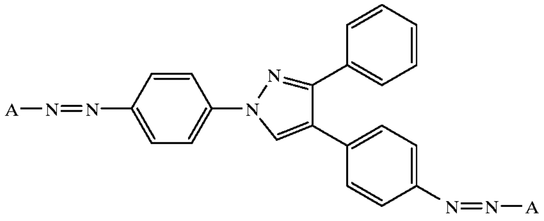 | G-6 |
| 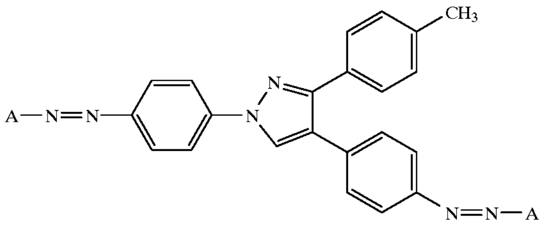 | H-6 |
| 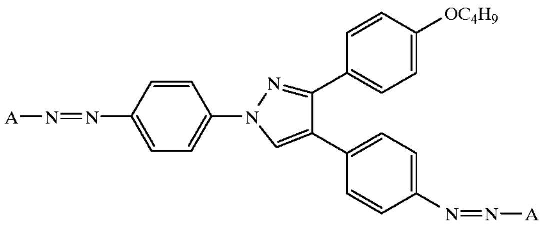 | I-6 |
| 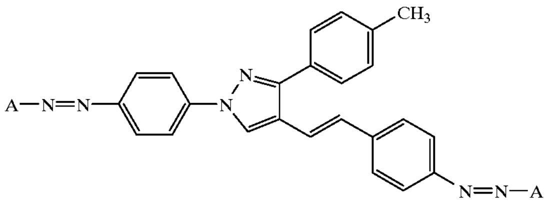 | J-6 |

TABLE 6-continued
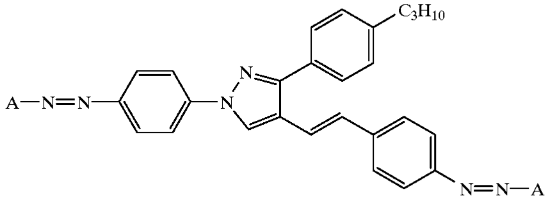
K-6
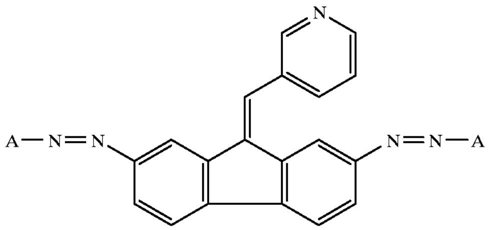
L-6
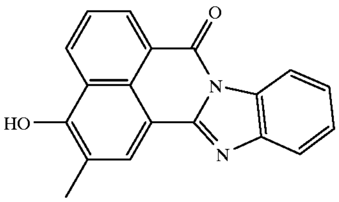
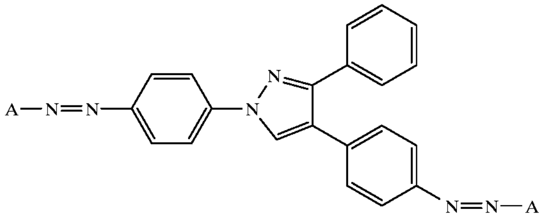
G-7
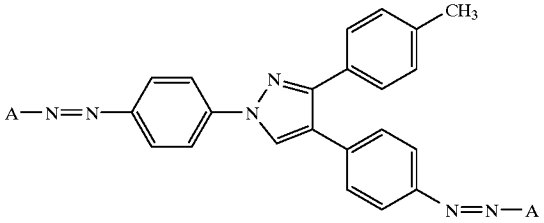
H-7
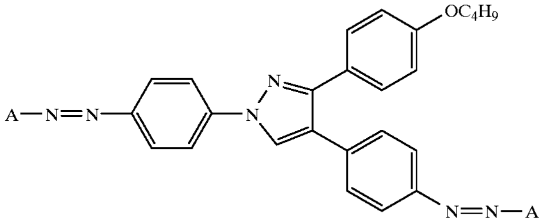
I-7

TABLE 6-continued
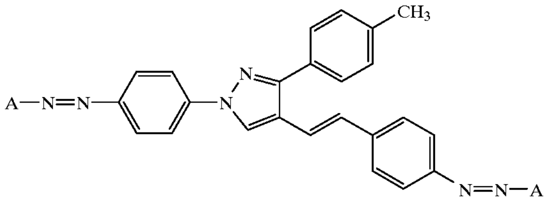
J-7
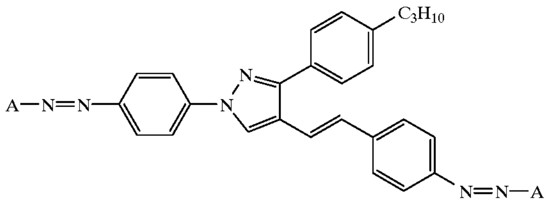
K-7
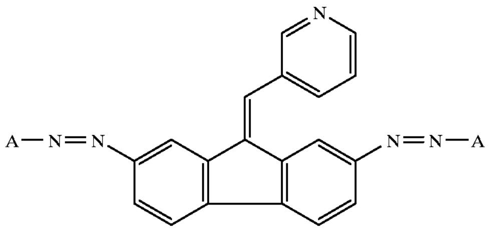
L-7
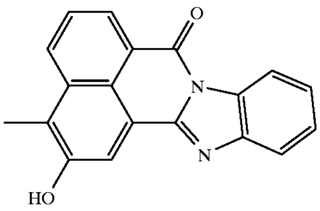
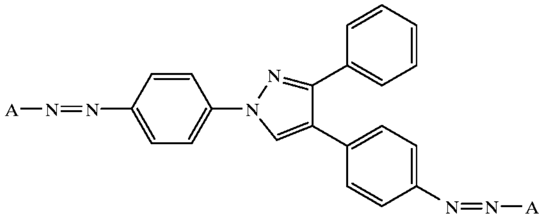
G-8
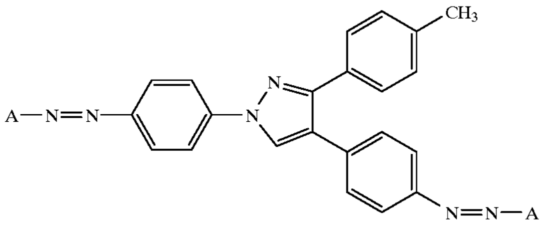
H-8
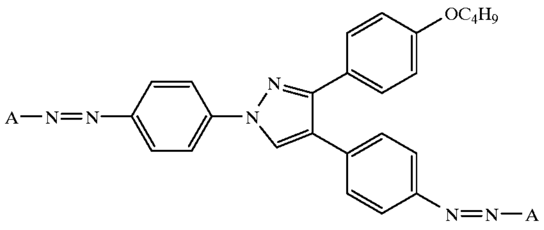
I-8

TABLE 6-continued
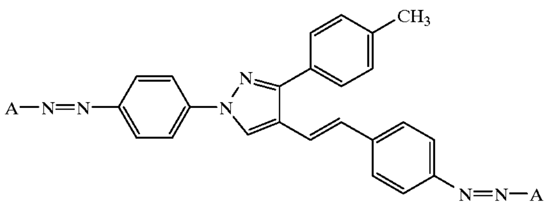
J-8
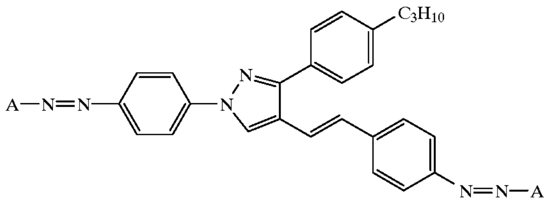
K-8
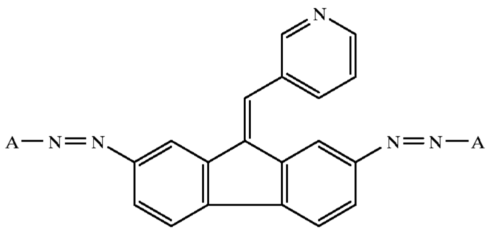
L-8
TABLE 7
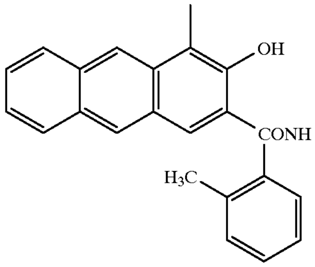
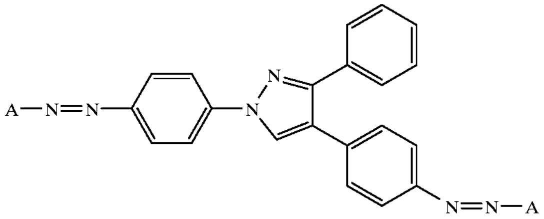
G-9
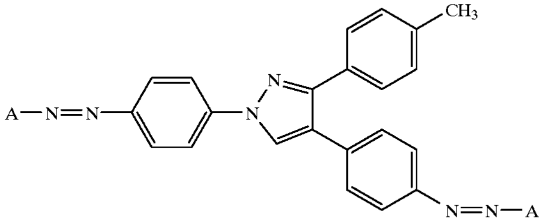
H-9

TABLE 7-continued
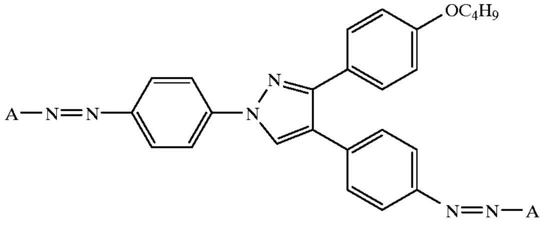
I-9
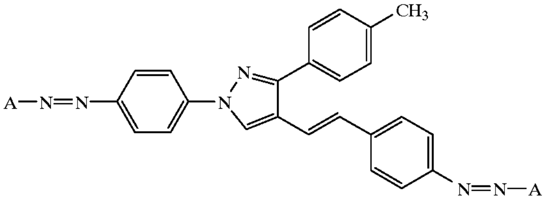
J-9
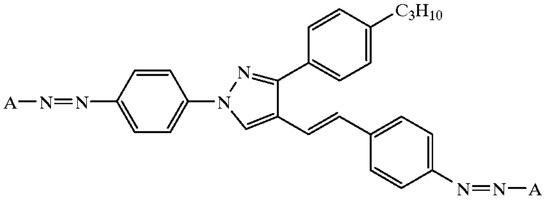
K-9
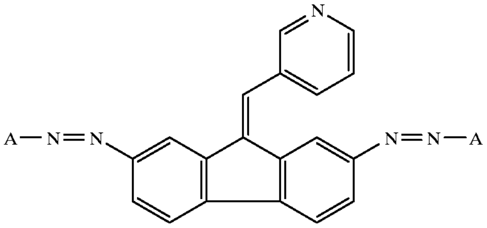
L-9
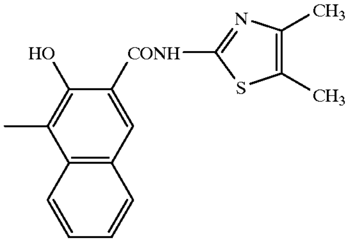
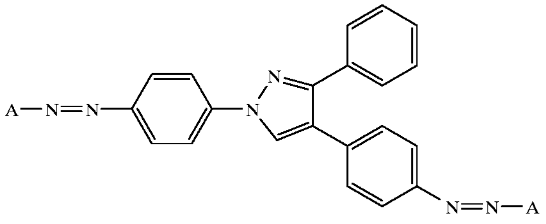
G-10

TABLE 7-continued
| | |
|---|---|
| 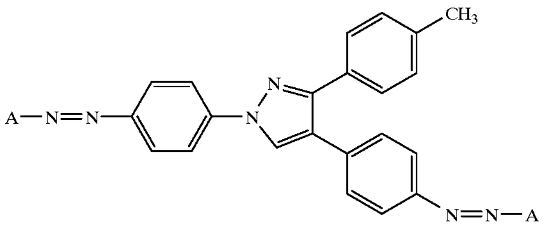 | H-10 |
| 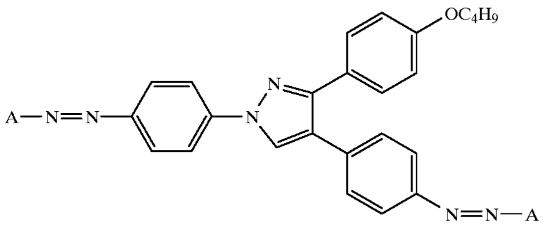 | I-10 |
| 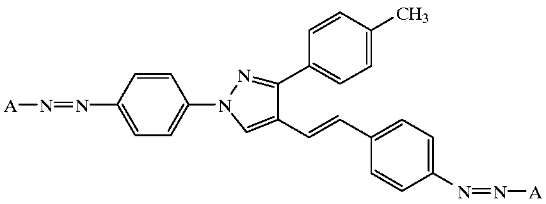 | J-10 |
| 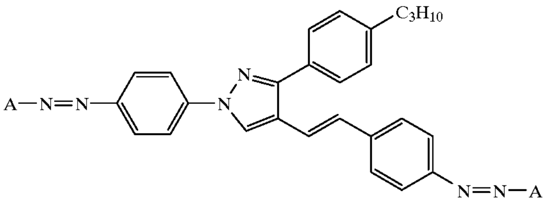 | K-10 |
| 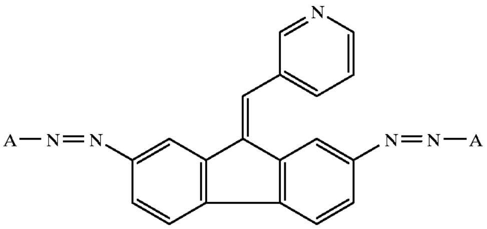 | L-10 |

TABLE 7-continued
| | 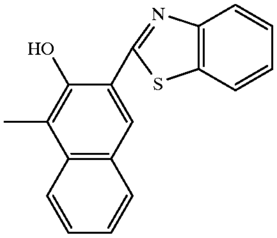 | 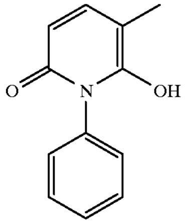 |
|---|---|---|
| 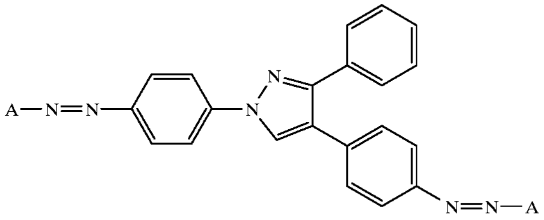 | G-11 | G-12 |
| 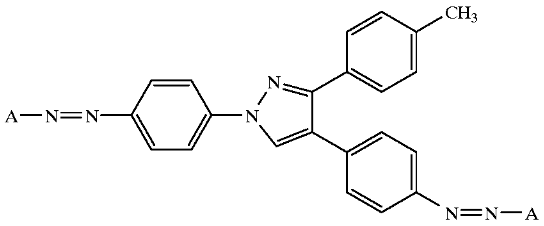 | H-11 | H-12 |
| 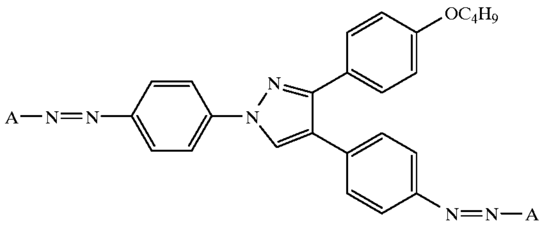 | I-11 | I-12 |
| 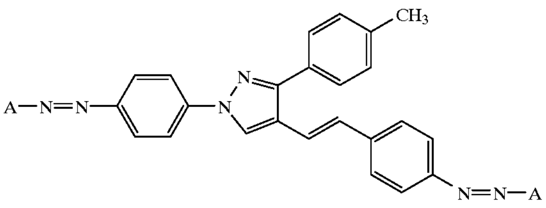 | J-11 | J-12 |
| 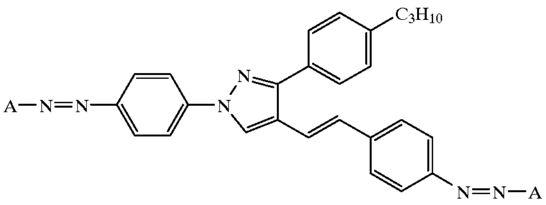 | K-11 | K-12 |

TABLE 7-continued
| | | |
|---|---|---|
| 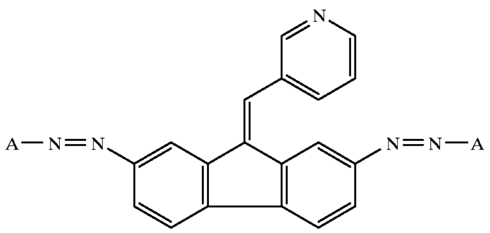 | L-11 | L-12 |
TABLE 8
| | |
|---|---|
| | 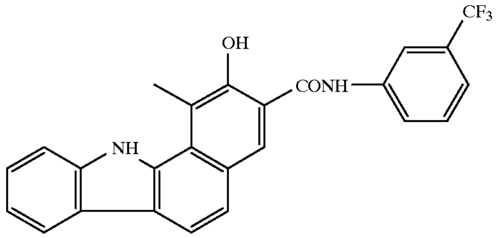 |
| 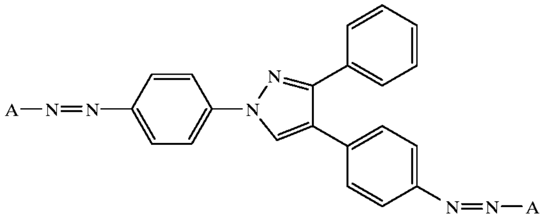 | G-13 |
| 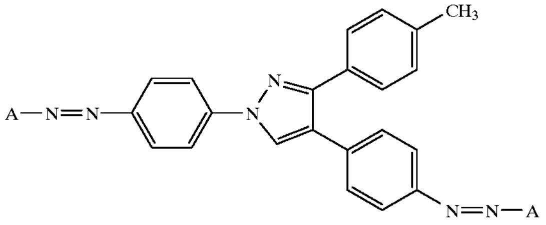 | H-13 |
| 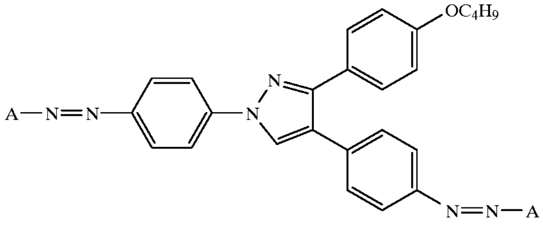 | I-13 |
| 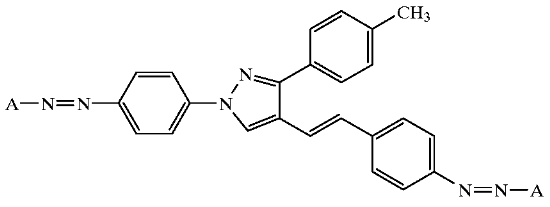 | J-13 |

TABLE 8-continued
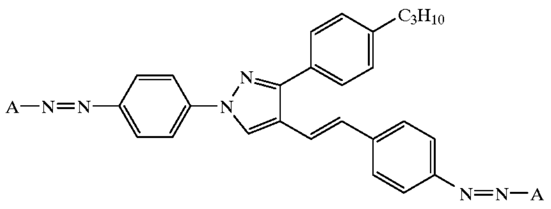
K-13
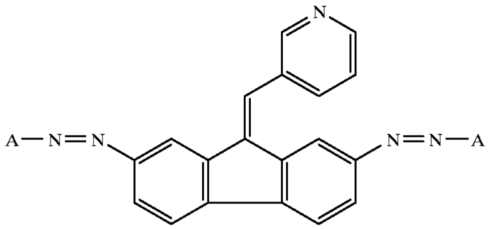
L-13
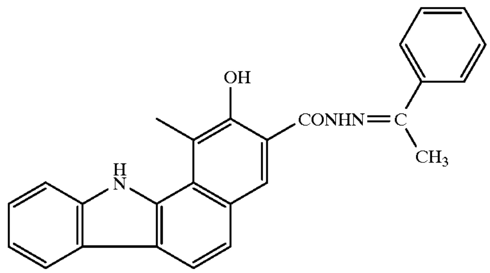
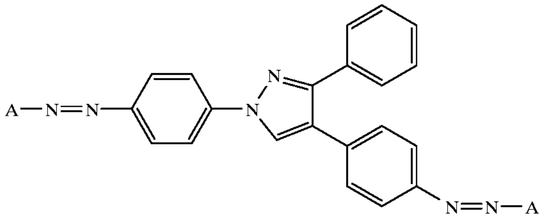
G-14
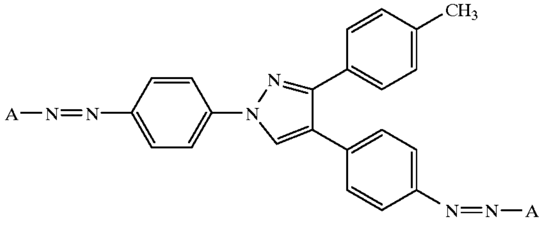
H-14
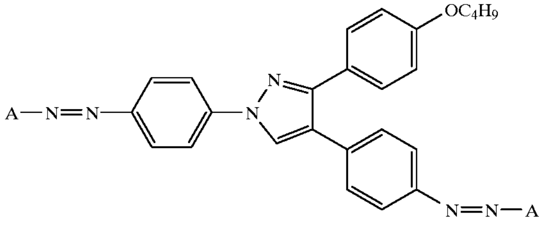
I-14

TABLE 8-continued
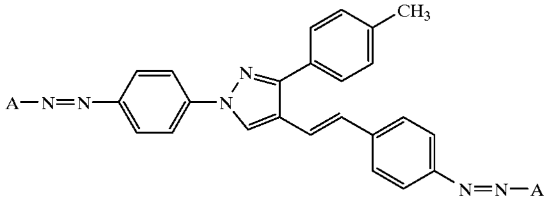
J-14
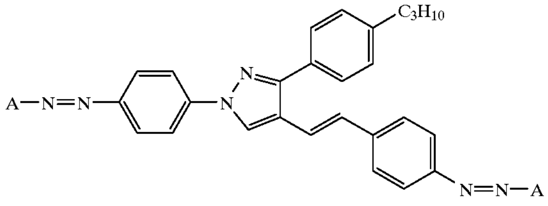
K-14
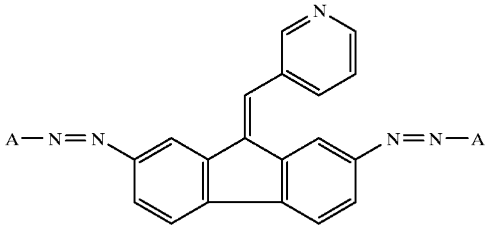
L-14
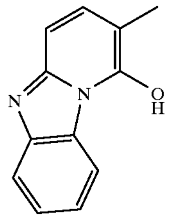
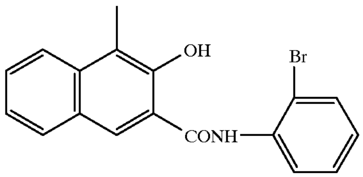
G-15 G-16
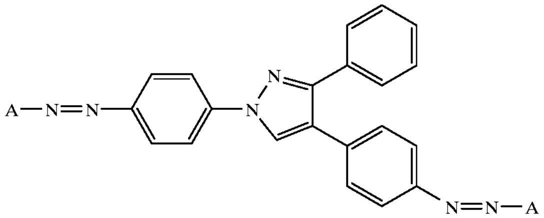
H-15 H-16
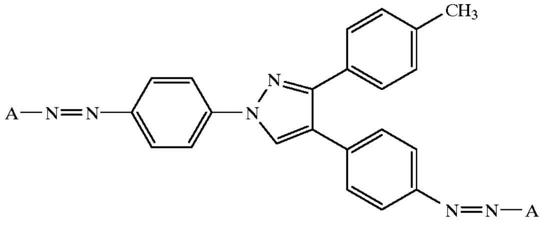

TABLE 8-continued
| | | |
|---|---|---|
| 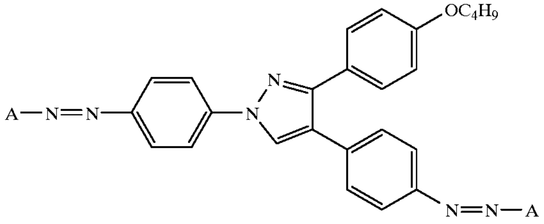 | I-15 | I-16 |
| 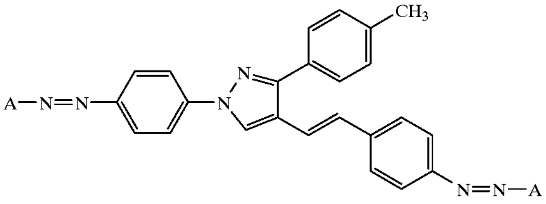 | J-15 | J-16 |
| 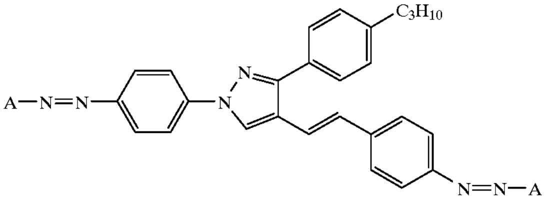 | K-15 | K-16 |
| 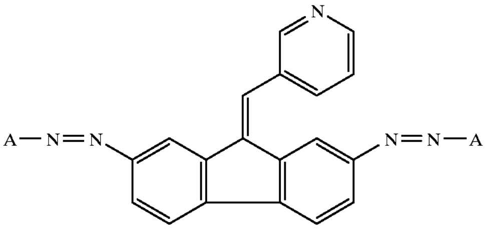 | L-15 | L-16 |

TABLE 9
| | | | | |
|---|---|---|---|---|
| | 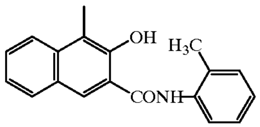 | 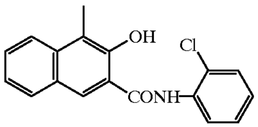 | 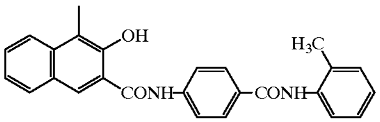 | 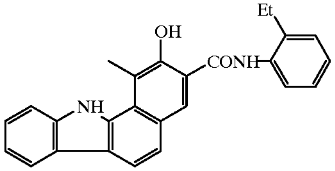 |
| 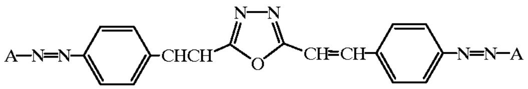 | M-1 | M-2 | M-3 | M-4 |
| 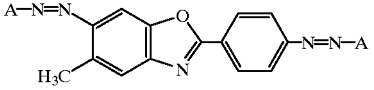 | N-1 | N-2 | N-3 | N-4 |
| 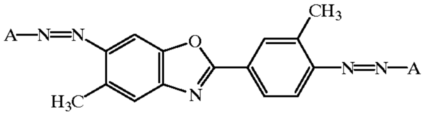 | O-1 | O-2 | O-3 | O-4 |
| 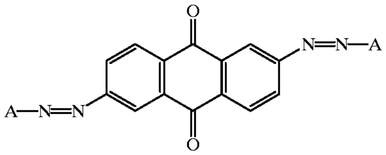 | P-1 | P-2 | P-3 | P-4 |

TABLE 9-continued
| | | | | |
|---|---|---|---|---|
| | 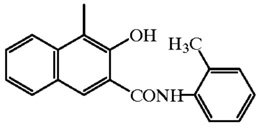 | 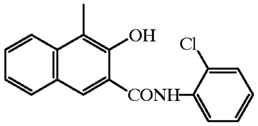 | 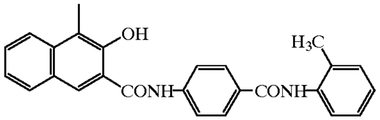 | 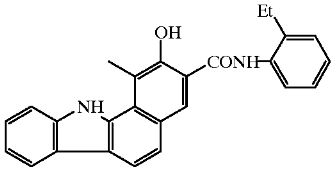 |
| 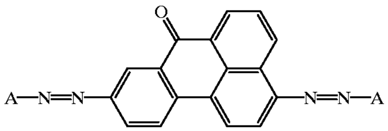 | Q-1 | Q-2 | Q-3 | Q-4 |
| 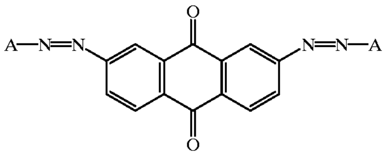 | R-1 | R-2 | R-3 | R-4 |

TABLE 10
| | 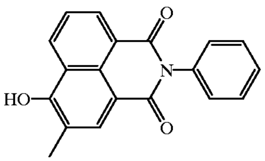 | 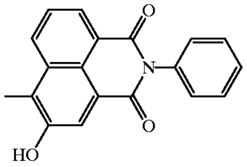 | 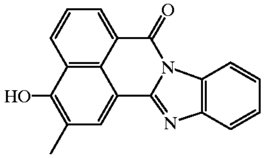 | 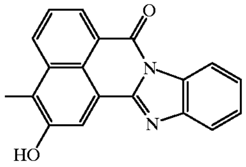 |
|---|---|---|---|---|
| 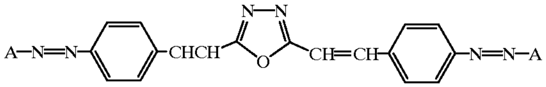 | M-5 | M-6 | M-7 | M-8 |
| 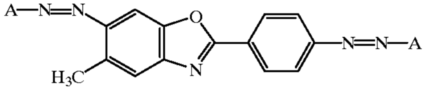 | N-5 | N-6 | N-7 | N-8 |
| 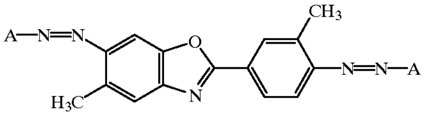 | O-5 | O-6 | O-7 | O-8 |
| 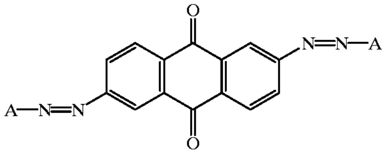 | P-5 | P-6 | P-7 | P-8 |

TABLE 10-continued
| | | | | |
|---|---|---|---|---|
| | 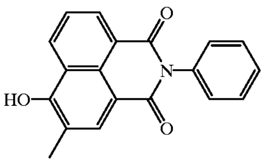 | 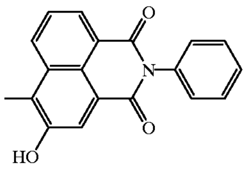 | 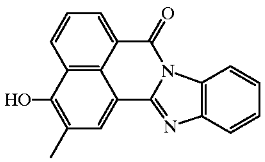 | 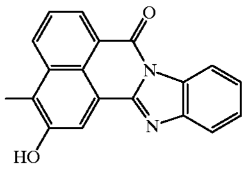 |
| 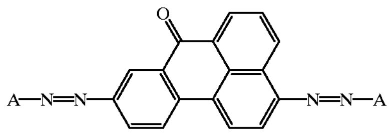 | Q-5 | Q-6 | Q-7 | Q-8 |
| 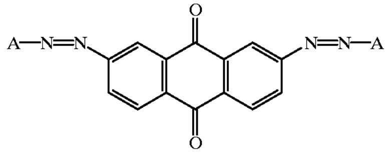 | R-5 | R-6 | R-7 | R-8 |

TABLE 11
| | 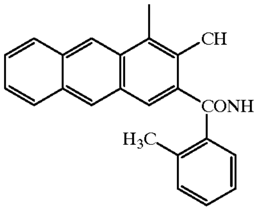 | 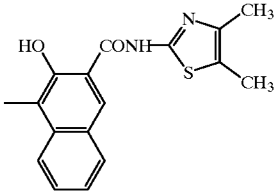 | 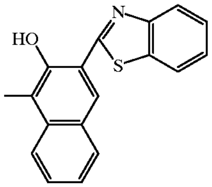 | 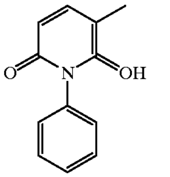 |
|---|---|---|---|---|
| 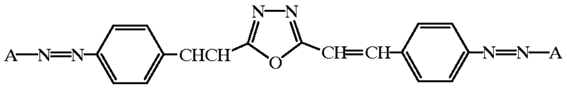 | M-9 | M-10 | M-11 | M-12 |
| 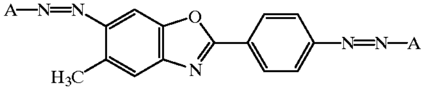 | N-9 | N-10 | N-10 | N-11 |
| 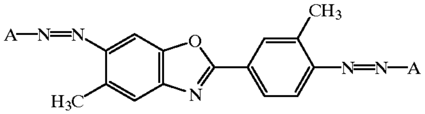 | O-9 | O-10 | O-11 | O-12 |
| 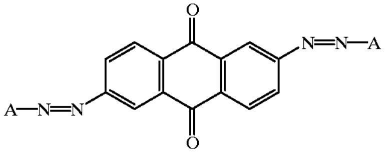 | P-9 | P-10 | P-11 | P-12 |

TABLE 11-continued
| | | | | |
|---|---|---|---|---|
| | 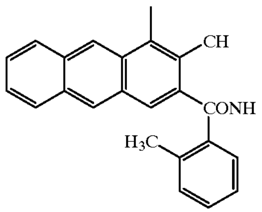 | 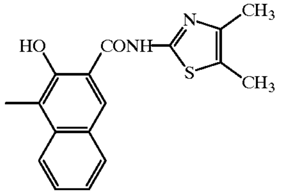 | 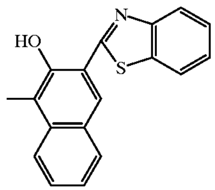 | 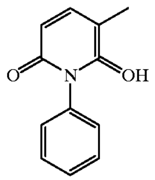 |
| 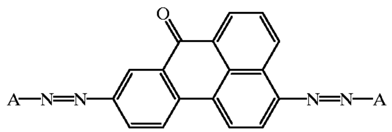 | Q-9 | Q-10 | Q-11 | Q-12 |
| 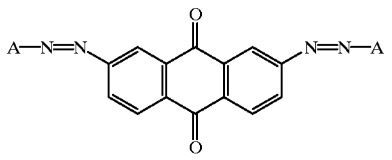 | R-9 | R-10 | R-11 | R-12 |

TABLE 12
| | 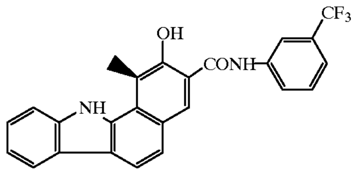 | 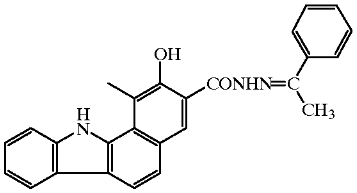 | 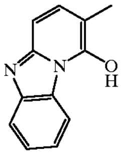 | 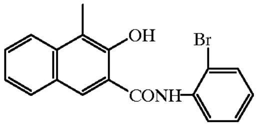 |
|---|---|---|---|---|
| 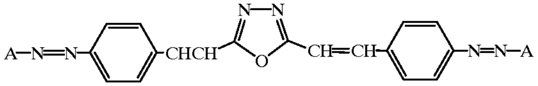 | M-13 | M-14 | M-15 | M-16 |
| 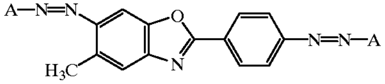 | N-13 | N-14 | N-15 | N-16 |
| 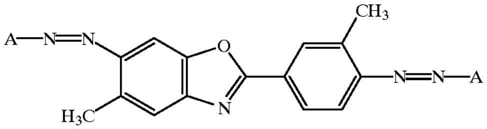 | O-13 | O-14 | O-15 | O-16 |
| 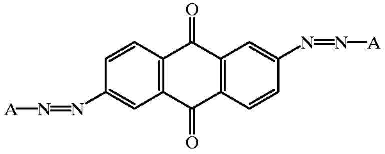 | P-13 | P-14 | P-15 | P-16 |

TABLE 12-continued
| | | | | |
|---|---|---|---|---|
| | 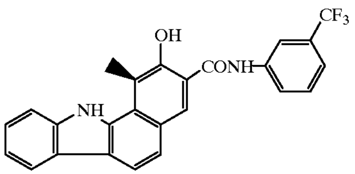 | 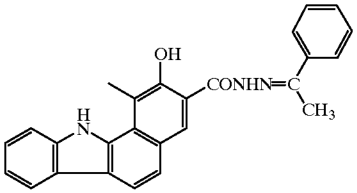 | 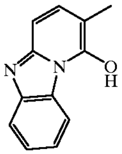 | 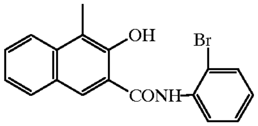 |
| 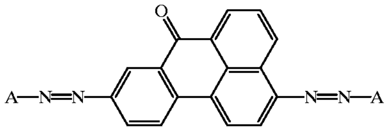 | Q-13 | Q-14 | Q-15 | Q-16 |
| 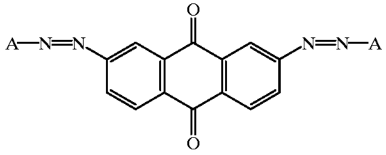 | R-13 | R-14 | R-15 | R-16 |

TABLE 13
| | 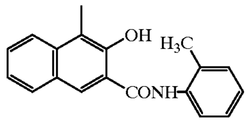 | 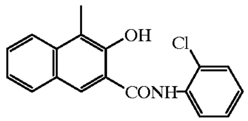 | 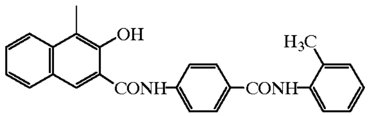 | 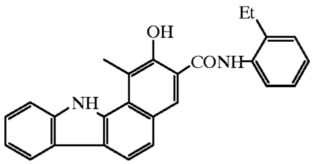 |
|---|---|---|---|---|
| 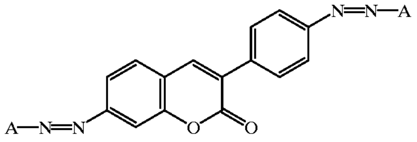 | S-1 | S-2 | S-3 | S-4 |
| 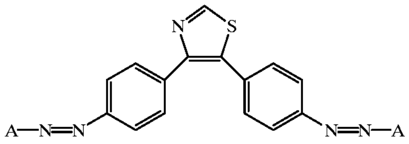 | T-1 | T-2 | T-3 | T-4 |
| 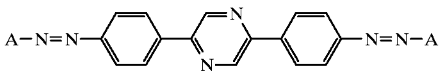 | U-1 | U-2 | U-3 | U-4 |

TABLE 13-continued
| | | | | |
|---|---|---|---|---|
| | 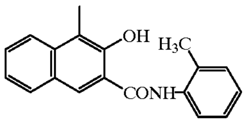 | 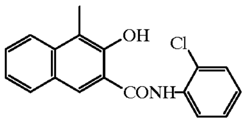 | 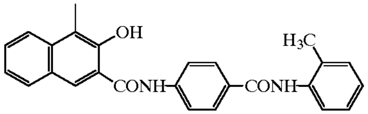 | 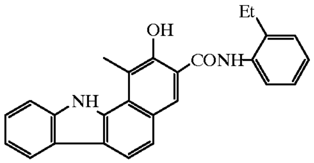 |
| 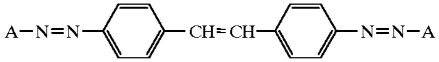 | V-1 | V-2 | V-3 | V-4 |
| 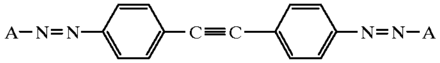 | W-1 | W-2 | W-3 | W-4 |
| 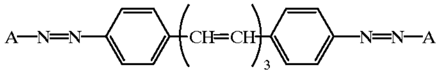 | X-1 | X-2 | X-3 | X-4 |

TABLE 14
| | 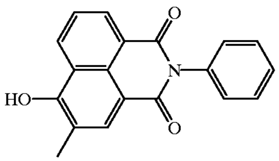 | 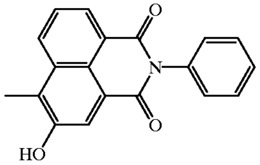 | 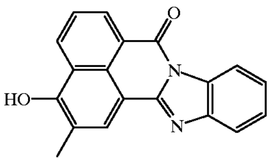 | 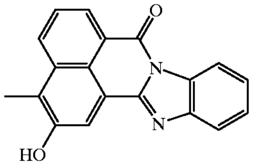 |
|---|---|---|---|---|
| 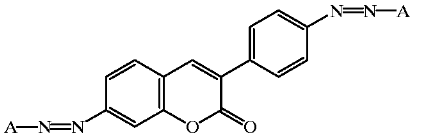 | S-5 | S-6 | S-7 | S-8 |
| 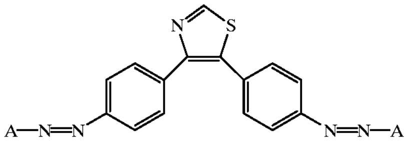 | T-5 | T-6 | T-7 | T-8 |
| 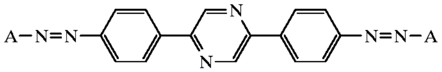 | U-5 | U-6 | U-7 | U-8 |
| 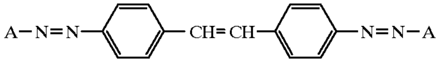 | V-5 | V-6 | V-7 | V-8 |
| 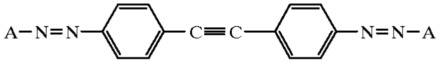 | W-5 | W-6 | W-7 | W-8 |
| 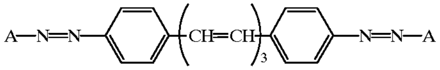 | X-5 | X-6 | X-7 | X-8 |

TABLE 15
| | 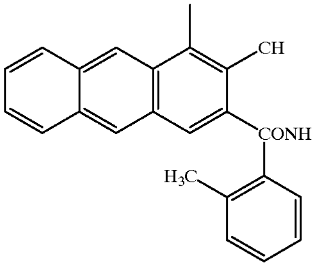 | 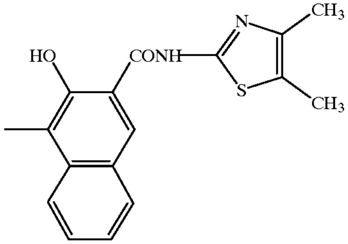 | 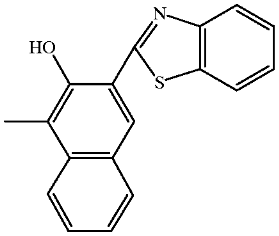 | 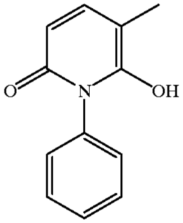 |
|---|---|---|---|---|
| 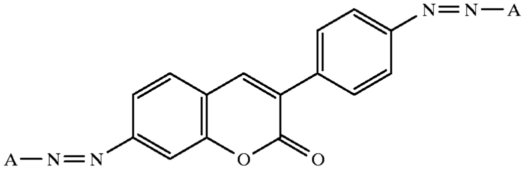 | S-9 | S-10 | S-11 | S-12 |
| 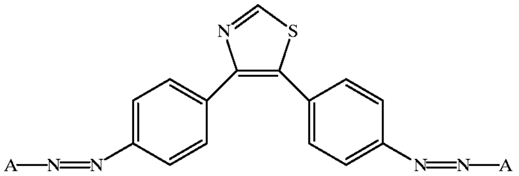 | T-9 | T-10 | T-11 | T-12 |
| 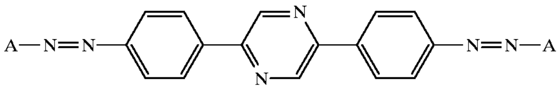 | U-9 | U-10 | U-11 | U-12 |

TABLE 15-continued
| | 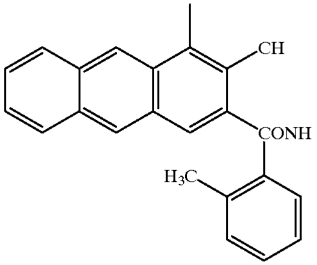 | 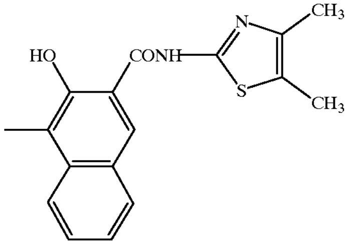 | 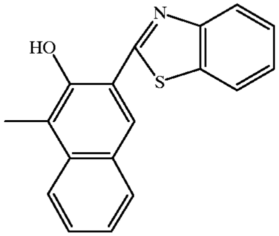 | 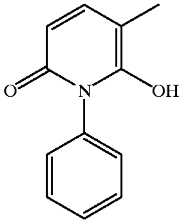 |
|---|---|---|---|---|
| 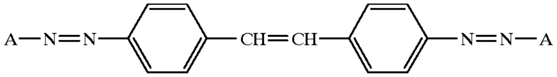 | V-9 | V-10 | V-11 | V-12 |
| 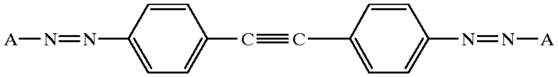 | W-9 | W-10 | W-11 | W-12 |
| 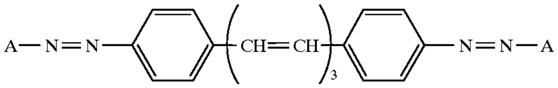 | X-9 | X-10 | X-11 | X-12 |

TABLE 16
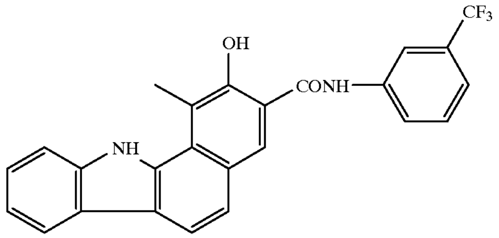
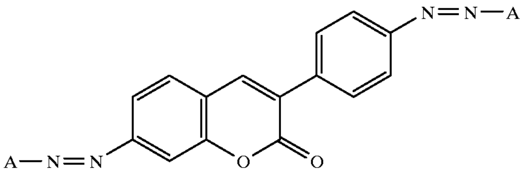
S-13
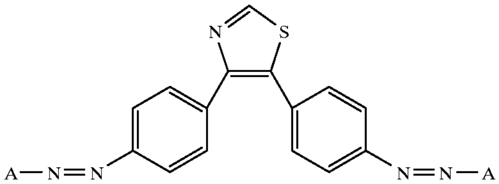
T-13
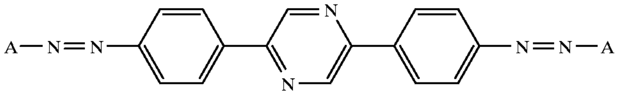
U-13
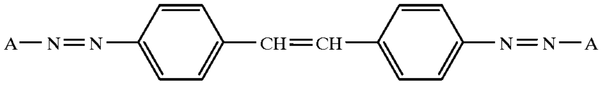
V-13
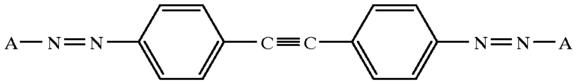
W-13
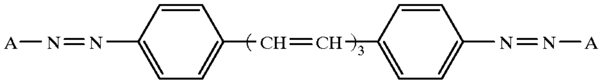
X-13
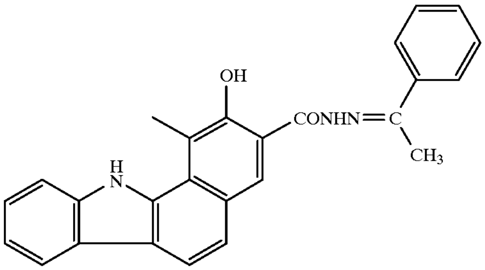
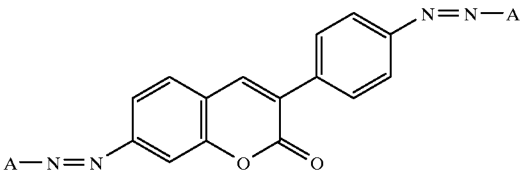
S-14

TABLE 16-continued
T-14
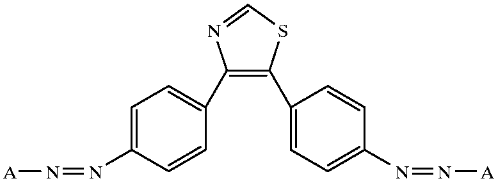
U-14
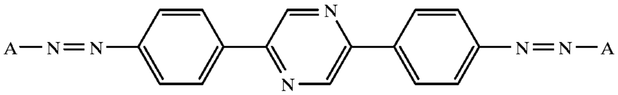
V-14
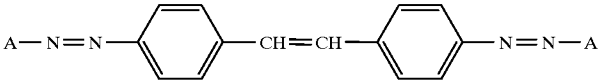
W-14
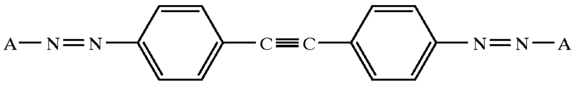
X-14
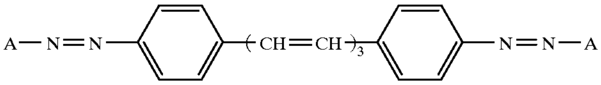
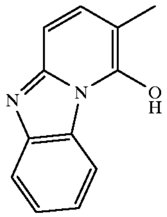
S-15
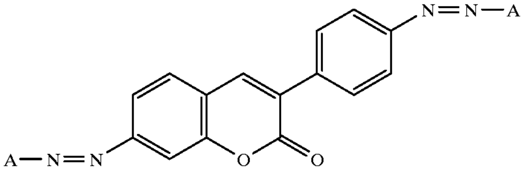
T-15
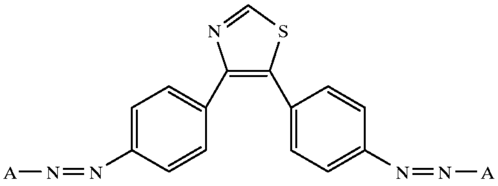
U-15
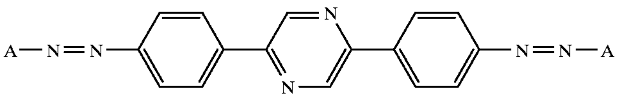
V-15
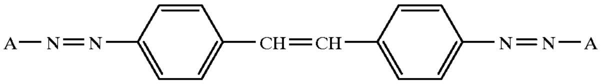

TABLE 16-continued
| | |
|---|---|
| 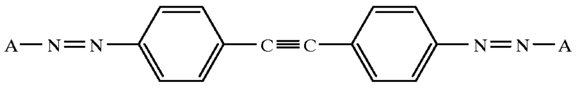 | W-15 |
| 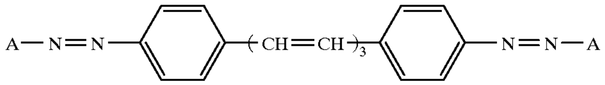 | X-15 |
| | 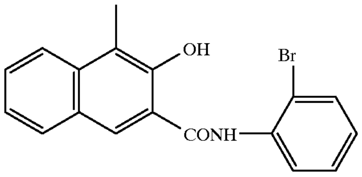 |
| 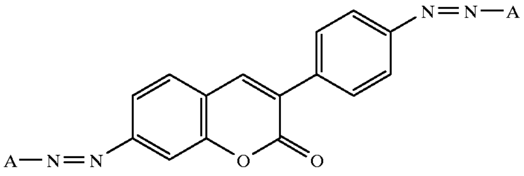 | S-16 |
| 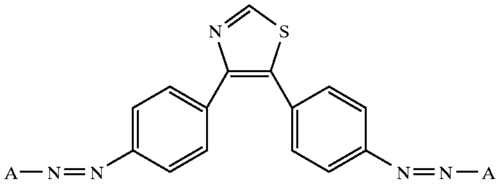 | T-16 |
| 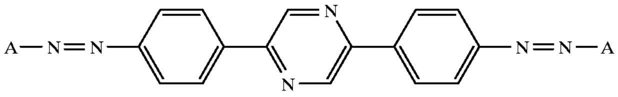 | U-16 |
| 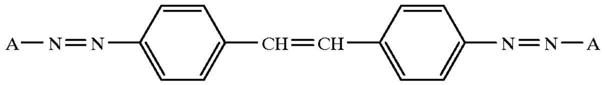 | V-16 |
| 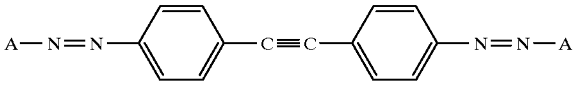 | W-16 |
| 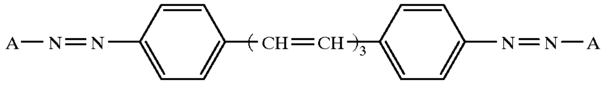 | X-16 |

TABLE 17
| | |
|---|---|
| | 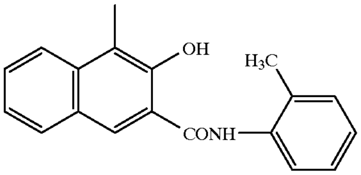 |
| 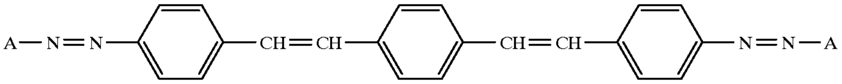 | Y-1 |
| 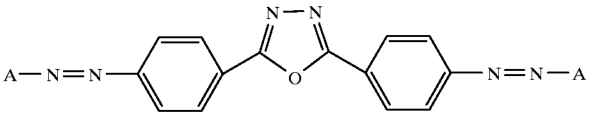 | Z-1 |
| 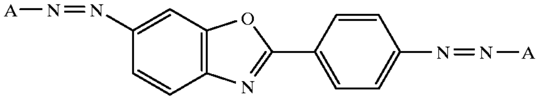 | A1-1 |
| 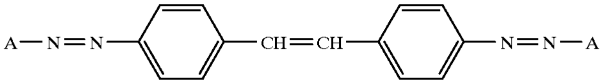 | A2-1 |
| 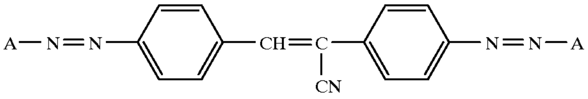 | A3-1 |
| 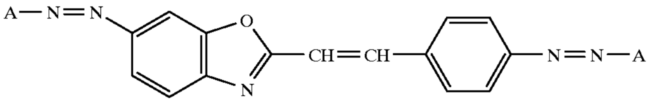 | A4-1 |
| | 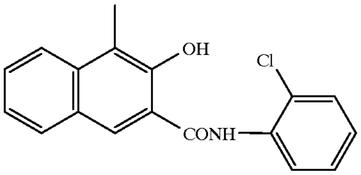 |
|  | Y-2 |
| 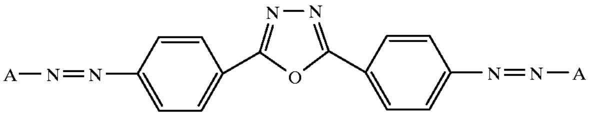 | Z-2 |
| 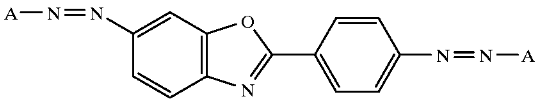 | A1-2 |
| 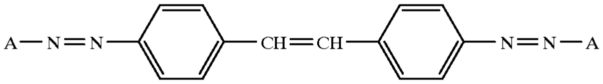 | A2-2 |

TABLE 17-continued
| | |
|---|---|
| 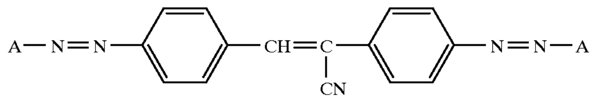 | A3-2 |
| 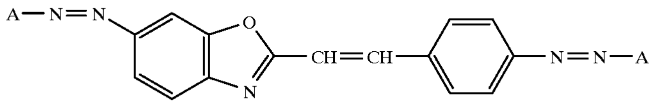 | A4-2 |
| 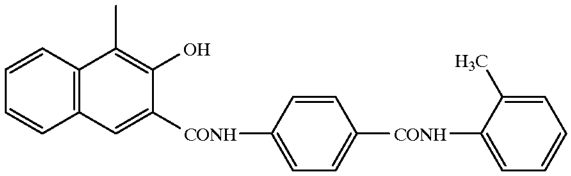 | |
|  | Y-3 |
| 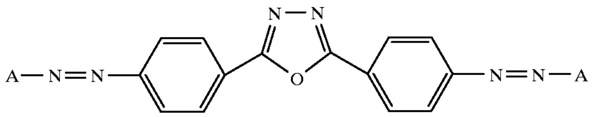 | Z-3 |
| 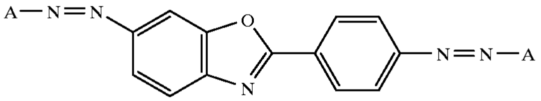 | A1-3 |
| 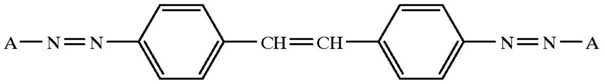 | A2-3 |
| 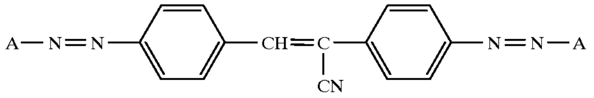 | A3-3 |
| 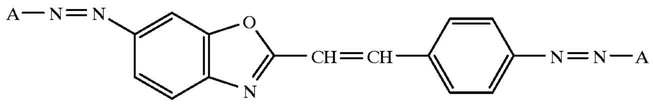 | A4-3 |
| 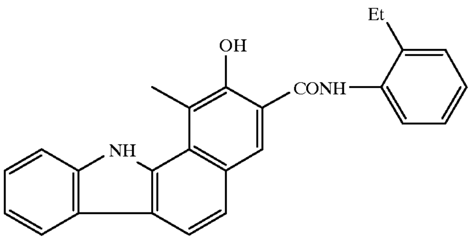 | |
| 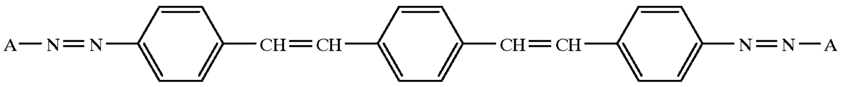 | Y-4 |

TABLE 17-continued
| | |
|---|---|
| 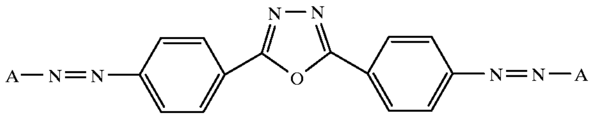 | Z-4 |
| 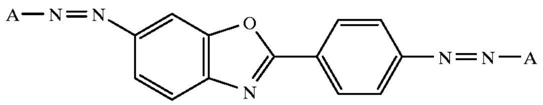 | A1-4 |
| 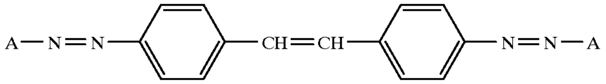 | A2-4 |
| 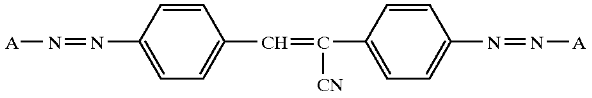 | A3-4 |
| 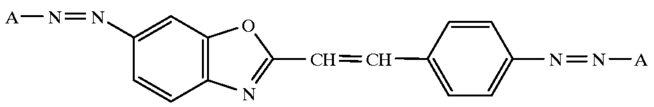 | A4-4 |
TABLE 18
| | 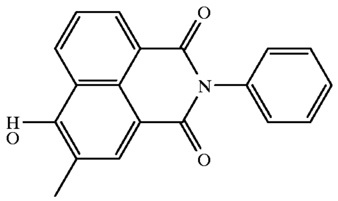 |
|---|---|
|  | Y-5 |
| 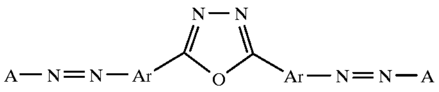 | Z-5 |
| 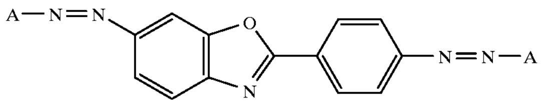 | A1-5 |
| 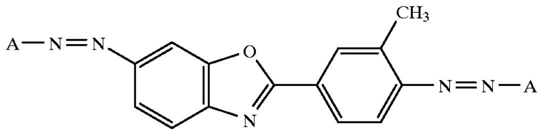 | A2-5 |
| 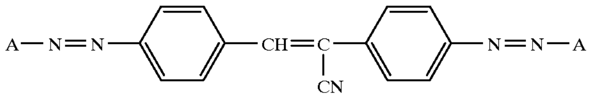 | A3-5 |

TABLE 18-continued
| | |
|---|---|
| 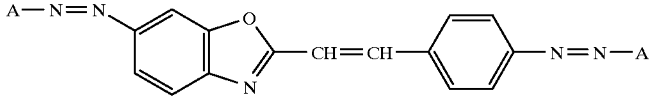 | A4-5 |
| 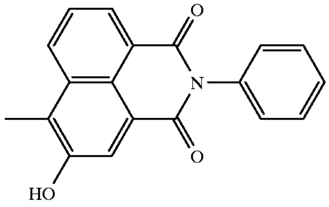 | |
| 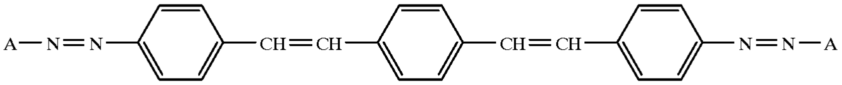 | Y-6 |
| 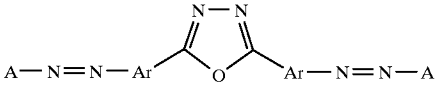 | Z-6 |
| 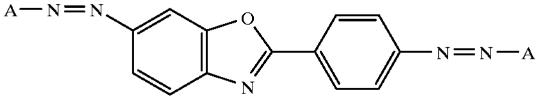 | A1-6 |
| 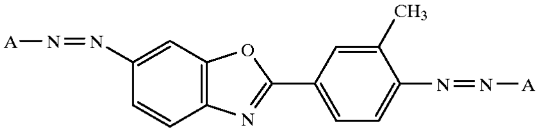 | A2-6 |
| 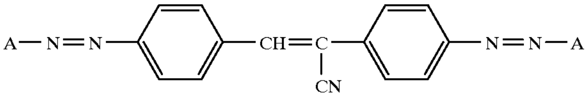 | A3-6 |
| 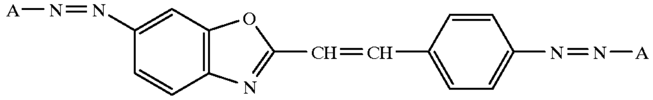 | A4-6 |
| 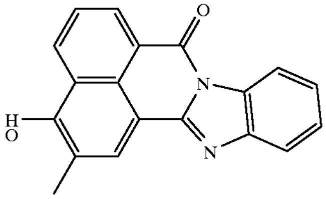 | |
|  | Y-7 |
| 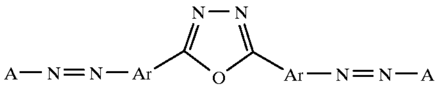 | Z-7 |

TABLE 18-continued
| | |
|---|---|
| 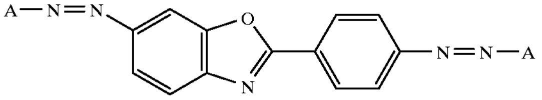 | A1-7 |
| 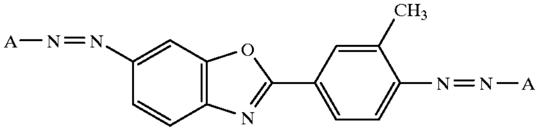 | A2-7 |
| 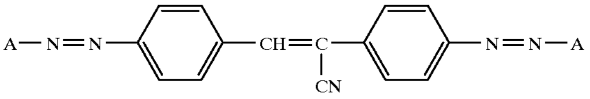 | A3-7 |
| 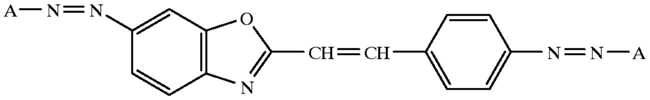 | A4-7 |
| 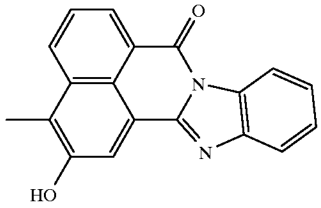 | |
| 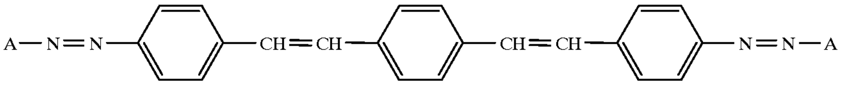 | Y-8 |
| 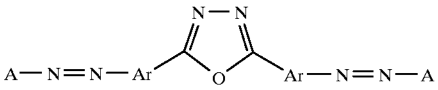 | Z-8 |
| 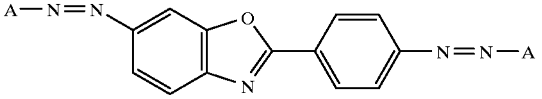 | A1-8 |
| 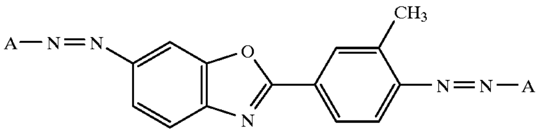 | A2-8 |
| 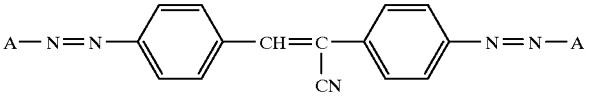 | A3-8 |
| 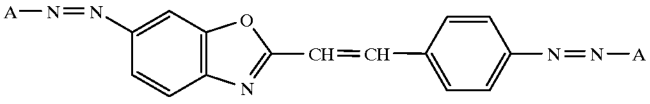 | A4-8 |

TABLE 19
| | |
|---|---|
| | 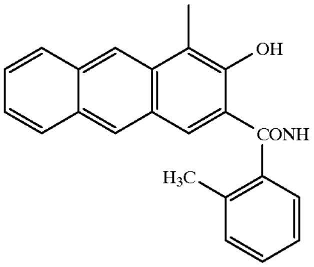 |
| 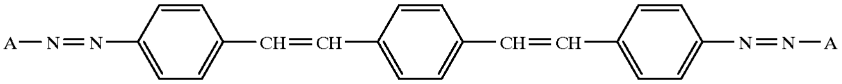 | Y-9 |
| 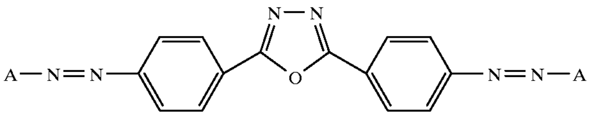 | Z-9 |
| 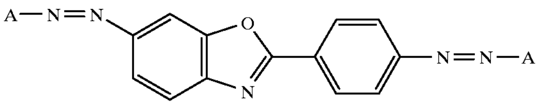 | A1-9 |
| 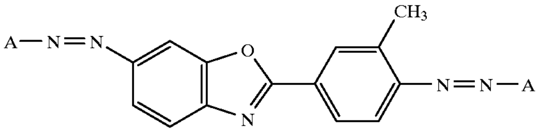 | A2-9 |
| 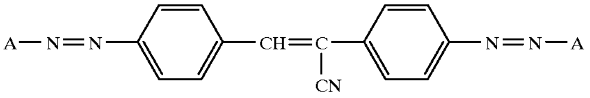 | A3-9 |
| 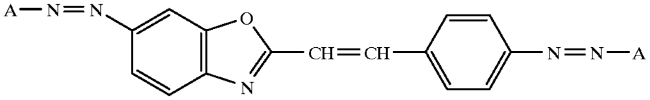 | A4-9 |
| | 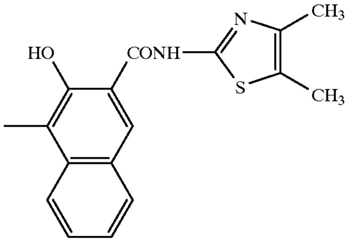 |
|  | Y-10 |
| 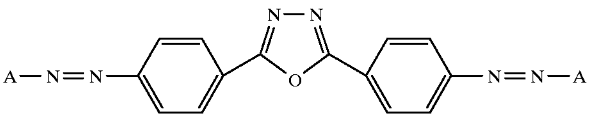 | Z-10 |

TABLE 19-continued
| | |
|---|---|
| 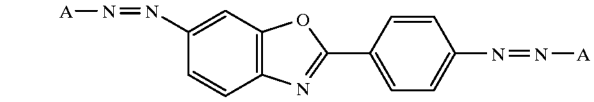 | A1-10 |
| 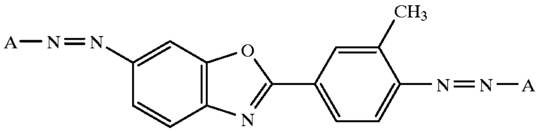 | A2-10 |
| 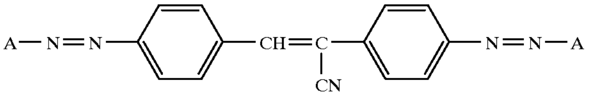 | A3-10 |
| 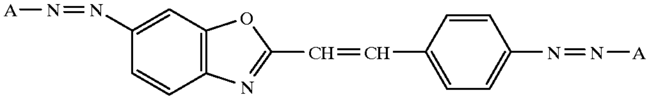 | A4-10 |
| | 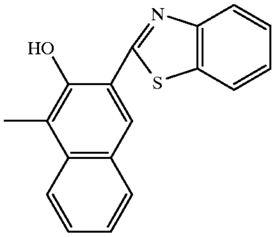 |
| 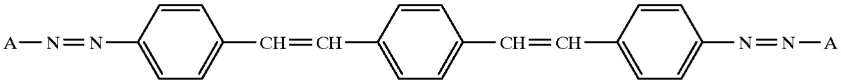 | Y-11 |
| 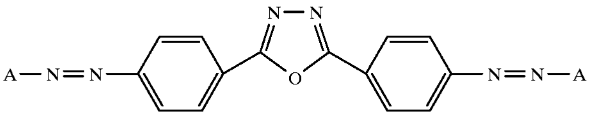 | Z-11 |
| 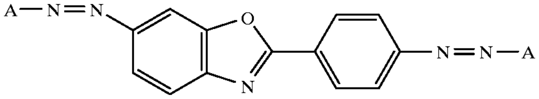 | A1-11 |
| 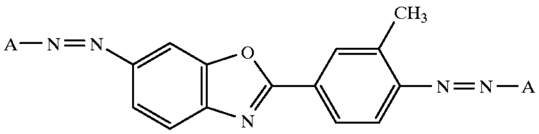 | A2-11 |
| 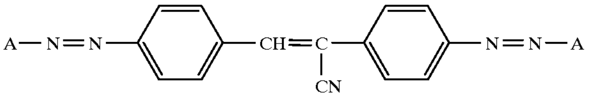 | A3-11 |
| 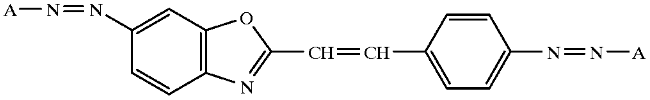 | A4-11 |

TABLE 19-continued
| | |
|---|---|
| 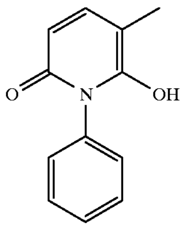 | |
|  | Y-12 |
| 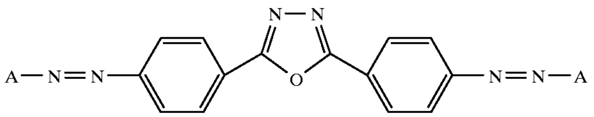 | Z-12 |
| 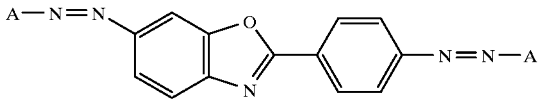 | A1-12 |
| 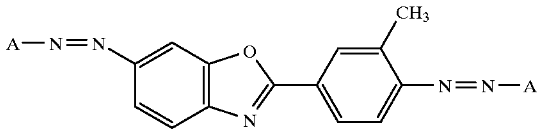 | A2-12 |
| 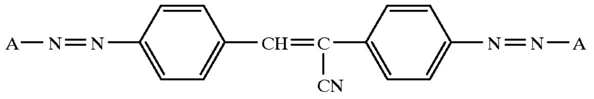 | A3-12 |
| 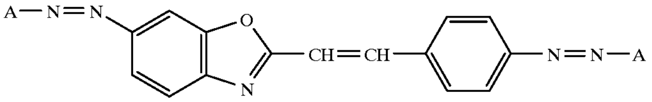 | A4-12 |
TABLE 20
| | |
|---|---|
| 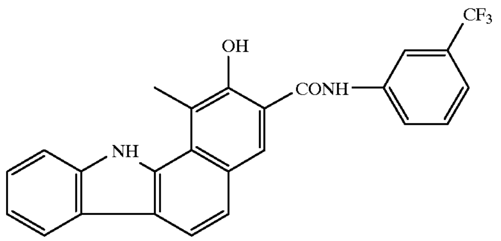 | |
|  | Y-13 |
| 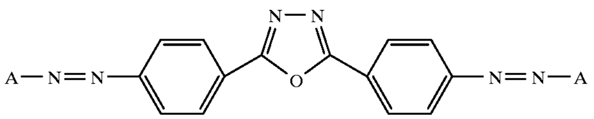 | Z-13 |

TABLE 20-continued
| | |
|---|---|
| 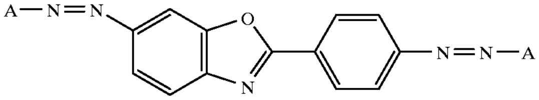 | A1-13 |
| 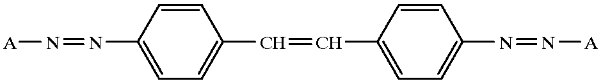 | A2-13 |
| 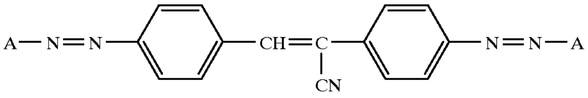 | A3-13 |
| 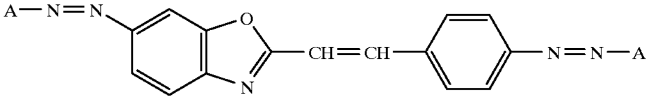 | A4-13 |
| 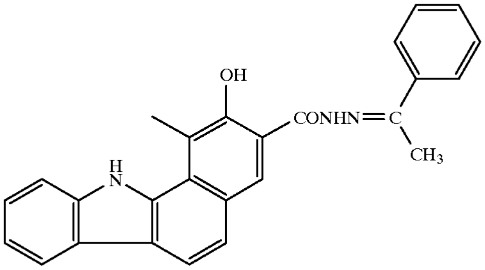 | |
|  | Y-14 |
| 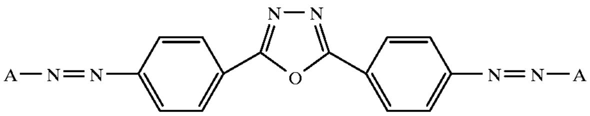 | Z-14 |
| 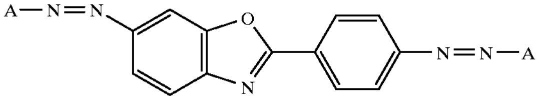 | A1-14 |
| 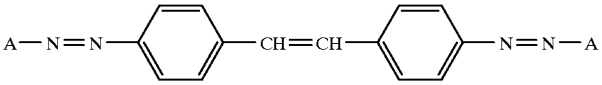 | A2-14 |
| 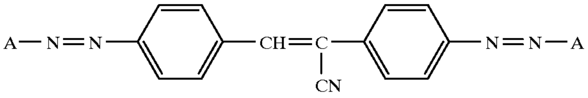 | A3-14 |
| 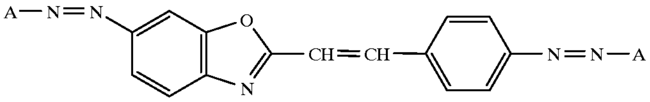 | A4-14 |

TABLE 20-continued
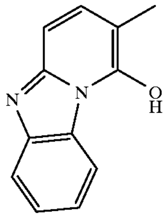
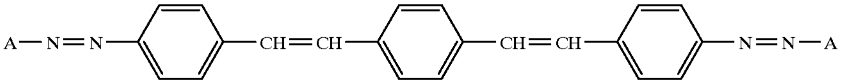
Y-15
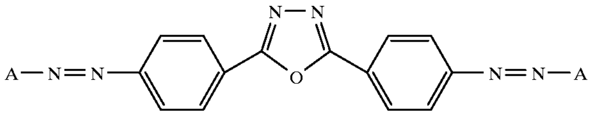
Z-15
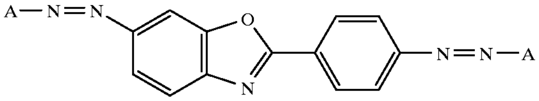
A1-15
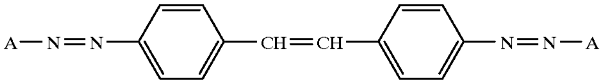
A2-15
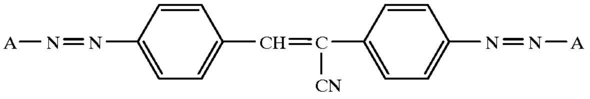
A3-15
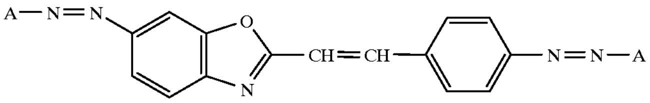
A4-15
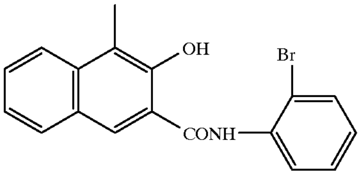
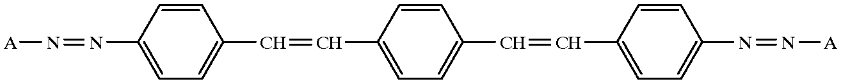
Y-16
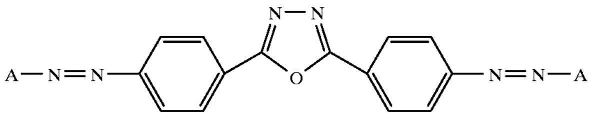
Z-16
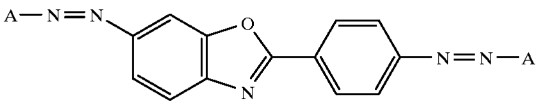
A1-16

TABLE 20-continued
| | |
|---|---|
| 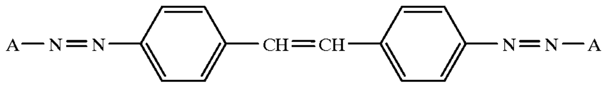 | A2-16 |
| 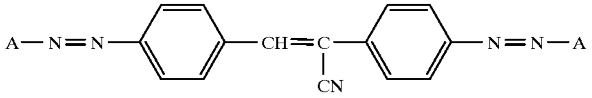 | A3-16 |
| 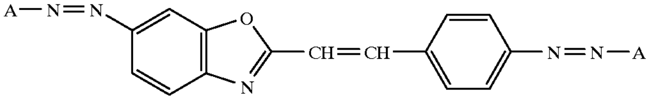 | A4-16 |
TABLE 21
| | |
|---|---|
| | 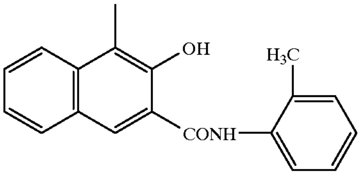 |
| 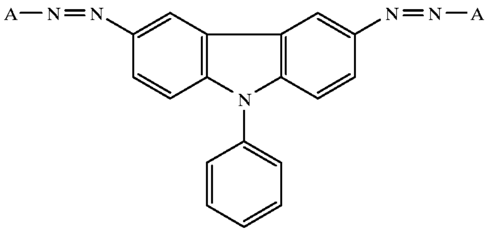 | A5-1 |
| 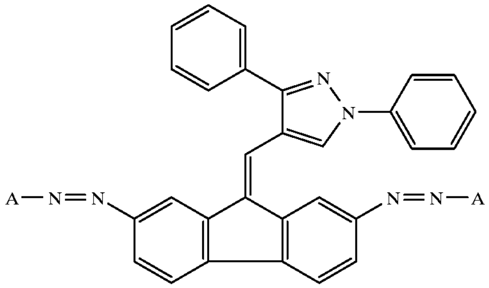 | A6-1 |
| 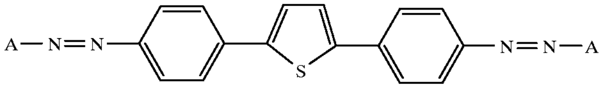 | A7-1 |
| 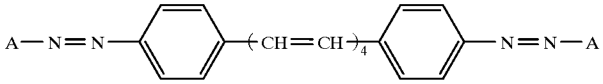 | A8-1 |
| 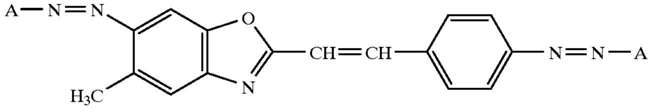 | A9-1 |

TABLE 21-continued
| | |
|---|---|
| 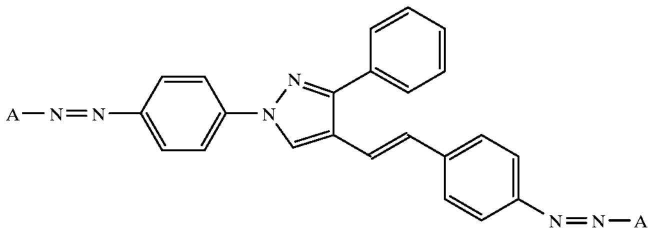 | B1-1 |
| | 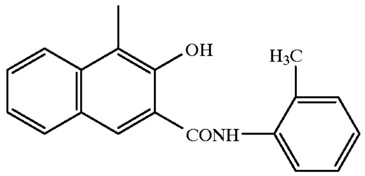 |
| 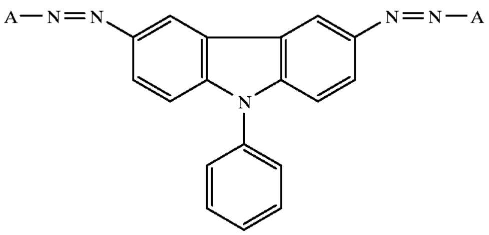 | A5-2 |
| 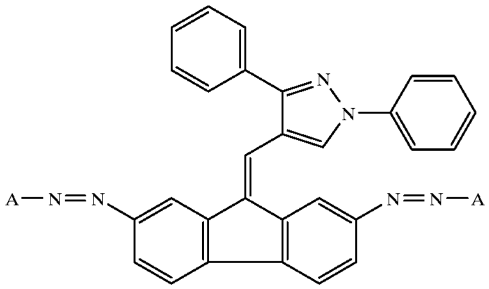 | A6-2 |
| 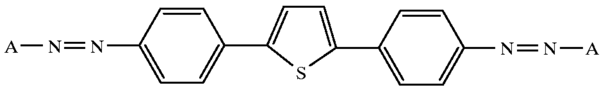 | A7-2 |
| 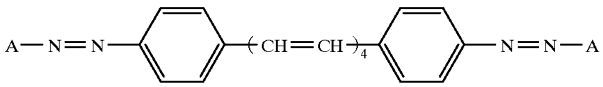 | A8-2 |
| 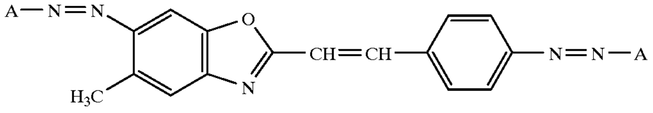 | A9-2 |

TABLE 21-continued
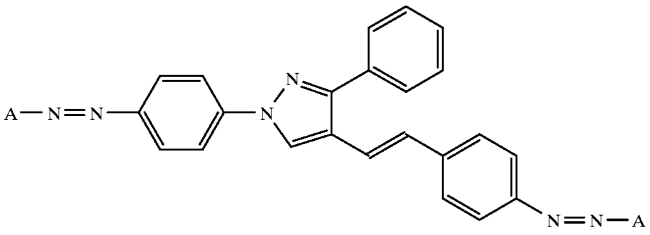
B1-2
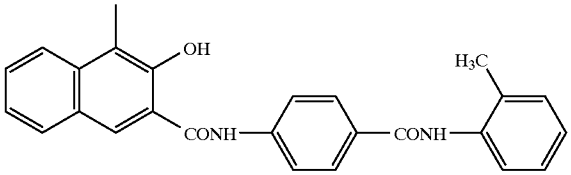
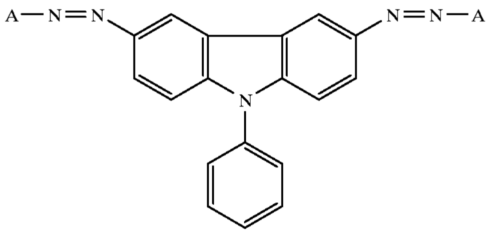
A5-3
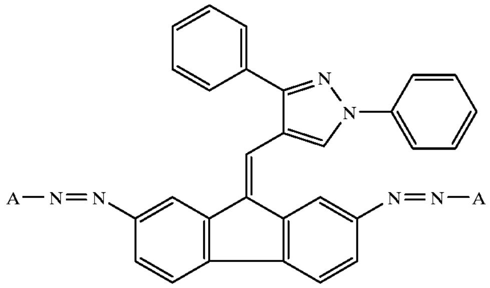
A6-3
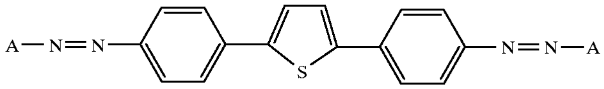
A7-3
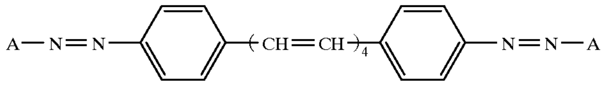
A8-3
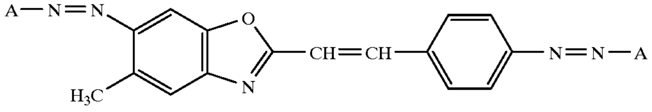
A9-3

TABLE 21-continued
| | |
|---|---|
| 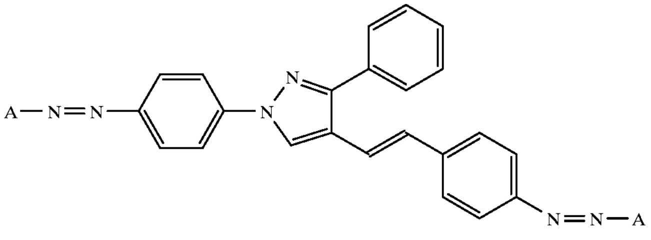 | B1-3 |
| | 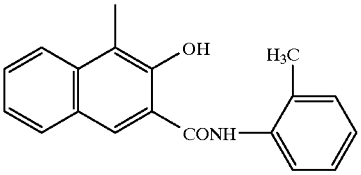 |
| 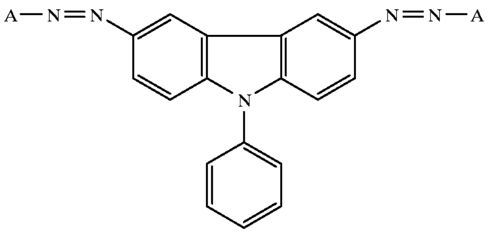 | A5-4 |
| 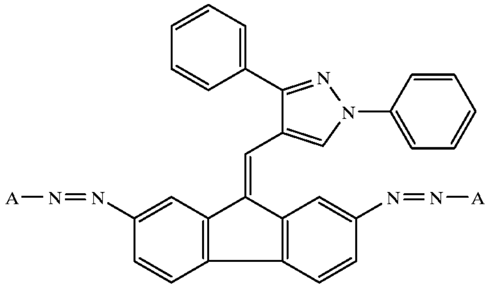 | A6-4 |
| 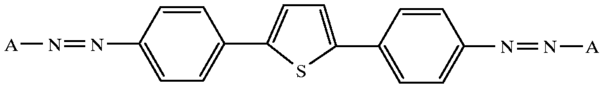 | A7-4 |
| 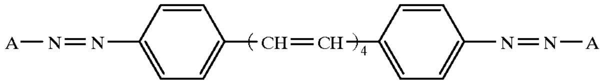 | A8-4 |
| 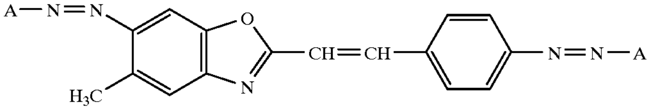 | A9-4 |

TABLE 21-continued
| | |
|---|---|
| 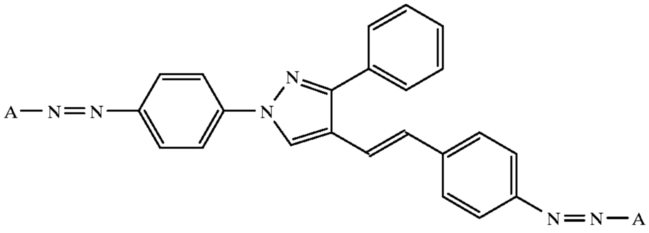 | B1-4 |
TABLE 22
| | |
|---|---|
| | 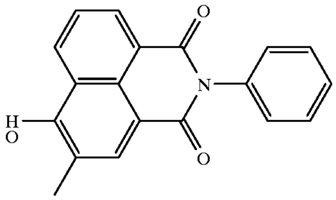 |
| 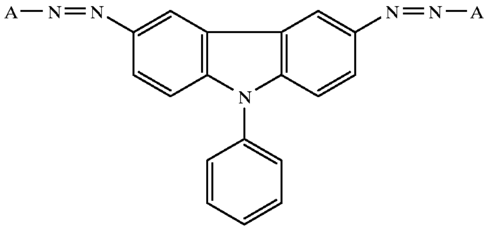 | A5-5 |
| 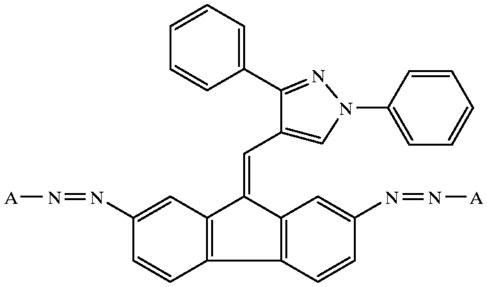 | A6-5 |
| 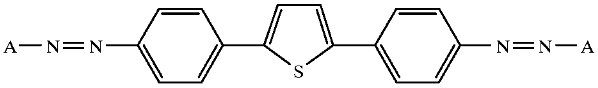 | A7-5 |
| 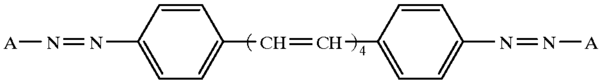 | A8-5 |
| 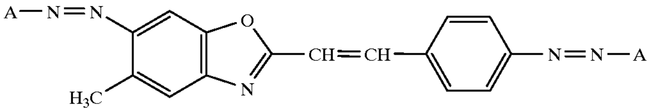 | A9-5 |

TABLE 22-continued
| | |
|---|---|
| 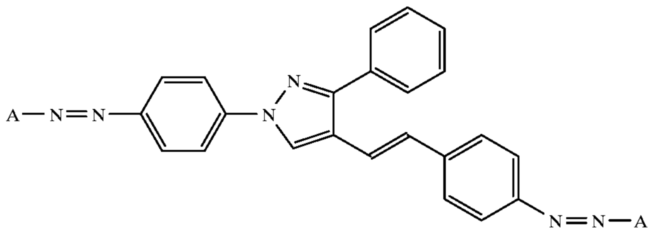 | B1-5 |
| 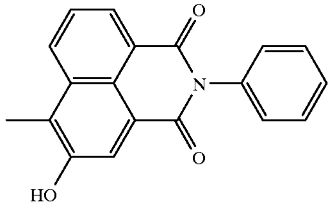 | |
| 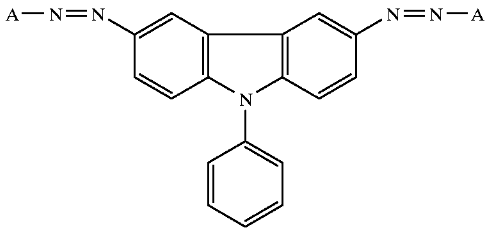 | A5-6 |
| 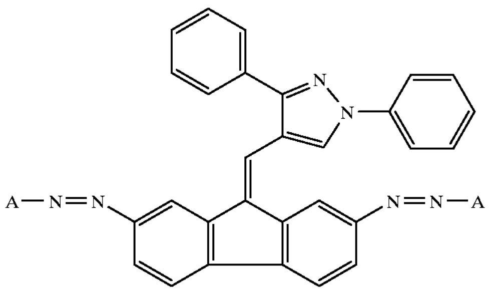 | A6-6 |
| 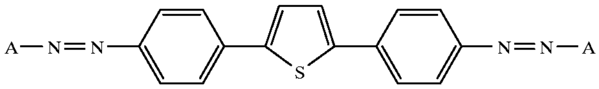 | A7-6 |
| 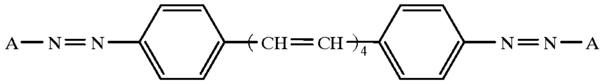 | A8-6 |
| 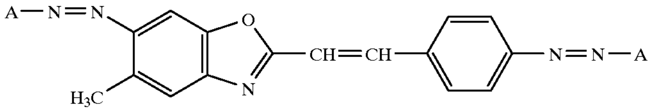 | A9-6 |

TABLE 22-continued
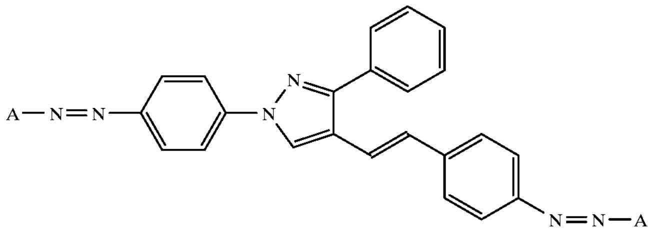
B1-6
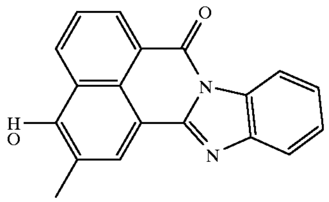
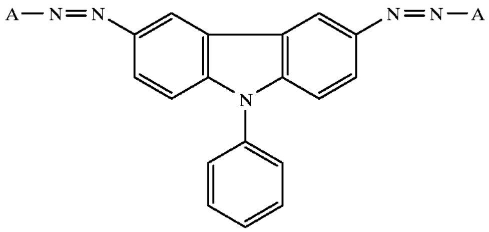
A5-7
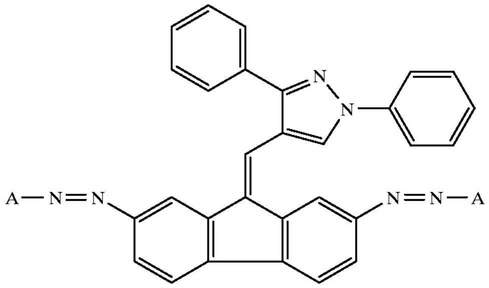
A6-7
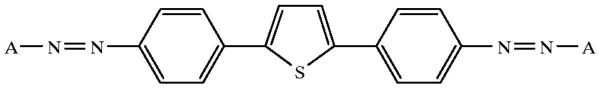
A7-7
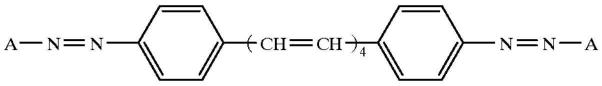
AB-7
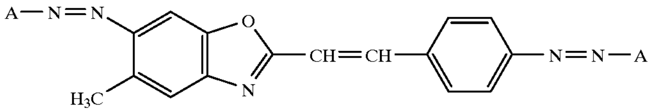
A9-7

TABLE 22-continued
| | |
|---|---|
| 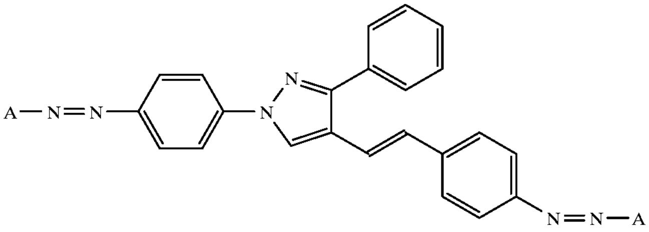 | B1-7 |
| 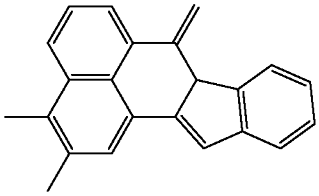 | |
| 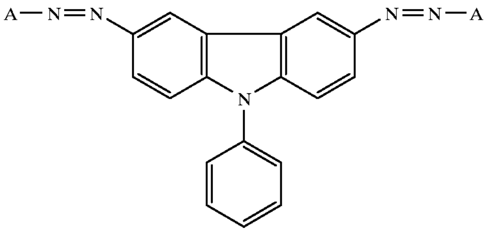 | A5-8 |
| 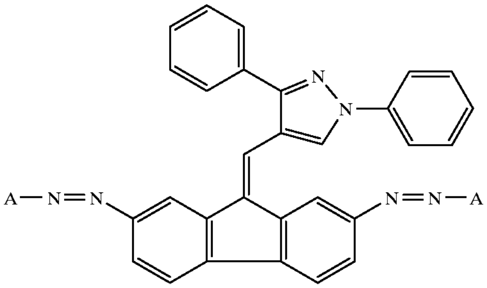 | A6-8 |
| 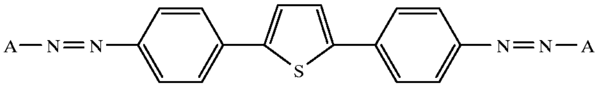 | A7-8 |
| 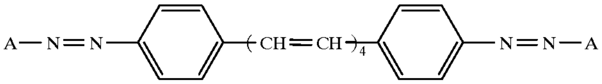 | A8-8 |
| 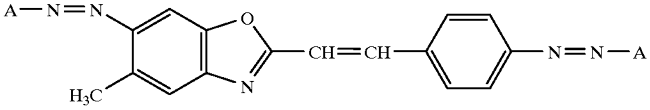 | A9-8 |

TABLE 22-continued
| | |
|---|---|
| 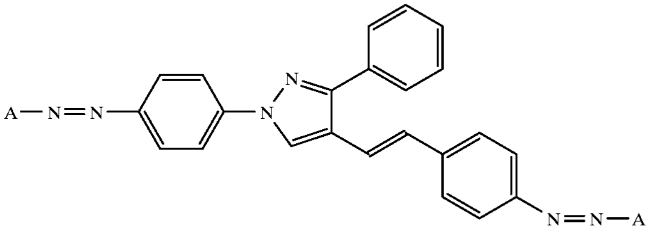 | B1-8 |
TABLE 23
| | |
|---|---|
| | 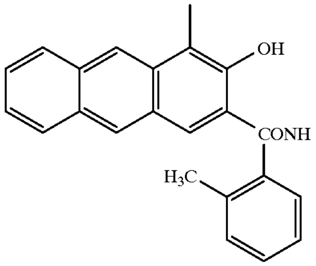 |
| 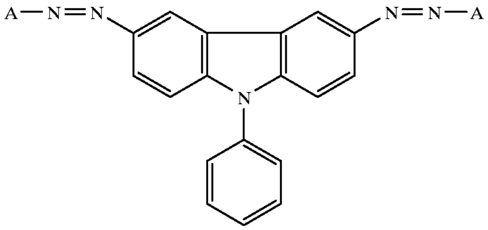 | A5-9 |
| 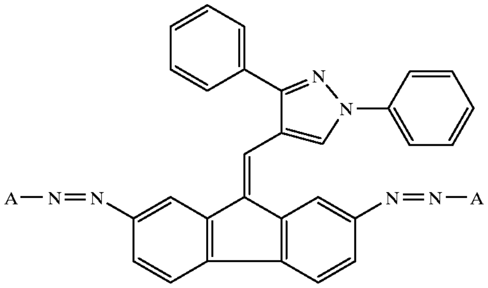 | A6-9 |
| 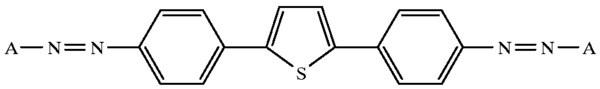 | A7-9 |
| 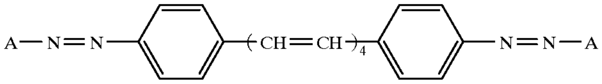 | A8-9 |
| 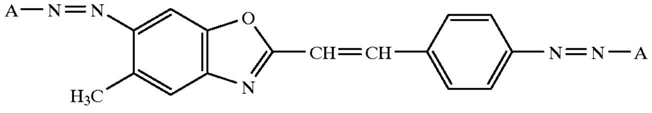 | A9-9 |

TABLE 23-continued
| | |
|---|---|
| 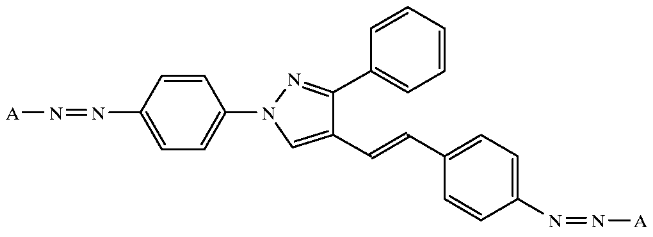 | B1-9 |
| 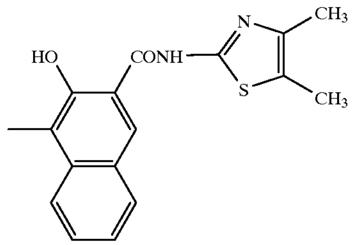 | |
| 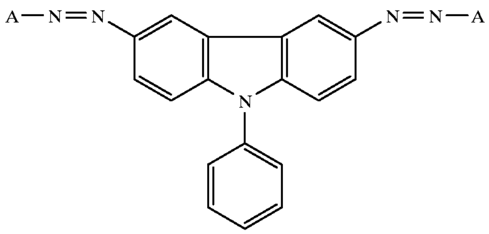 | A5-10 |
| 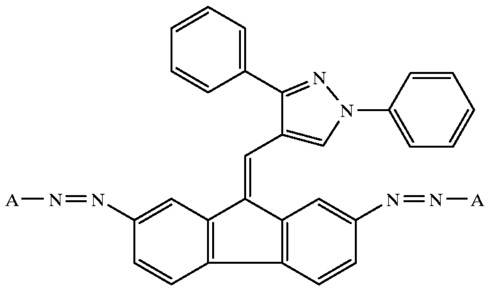 | A6-10 |
| 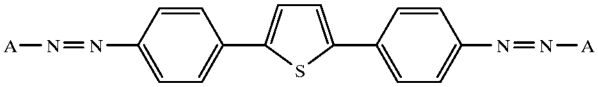 | A7-10 |
| 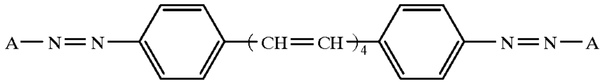 | A8-10 |
| 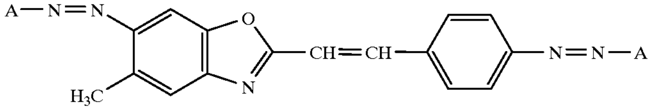 | A9-10 |

TABLE 23-continued
| | |
|---|---|
| 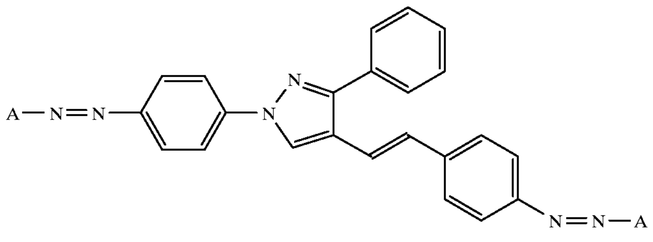 | B1-10 |
| 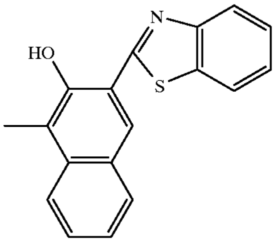 | |
| 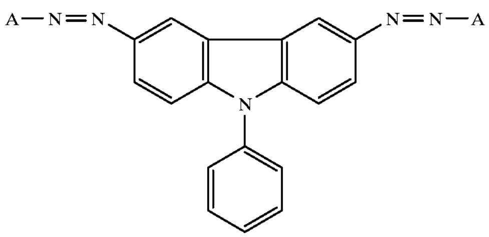 | A5-11 |
| 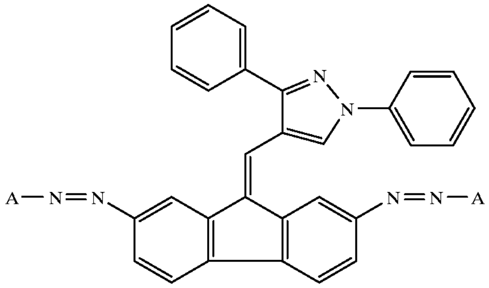 | A6-11 |
| 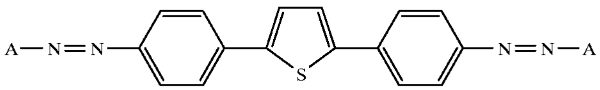 | A7-11 |
| 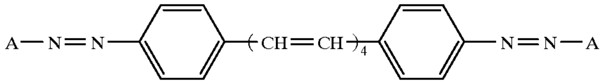 | A8-11 |
| 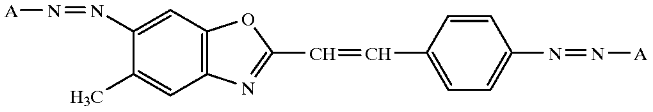 | A9-11 |

TABLE 23-continued
| | |
|---|---|
| 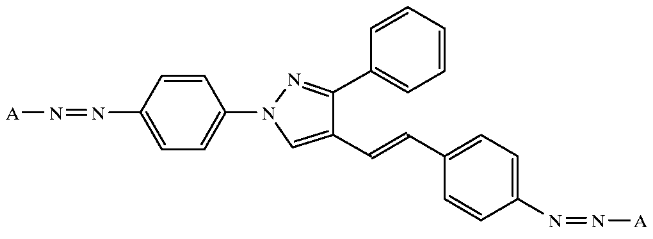 | B1-11 |
| | 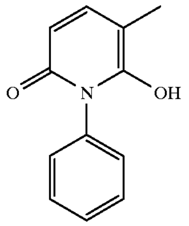 |
| 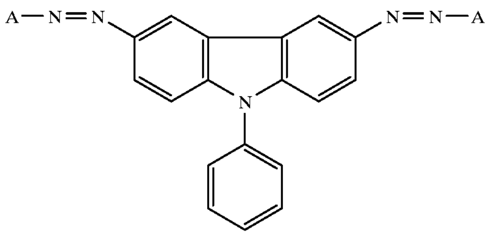 | A5-12 |
| 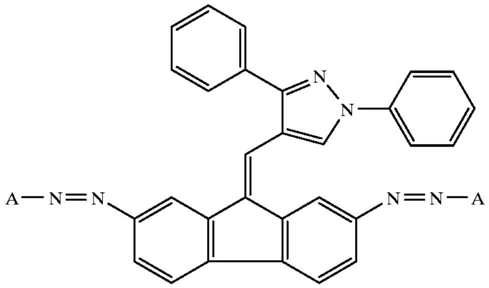 | A6-12 |
| 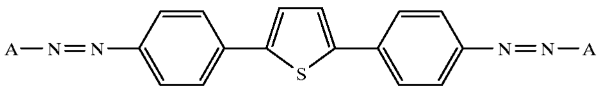 | A7-12 |
| 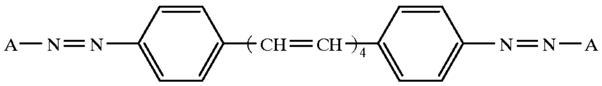 | A8-12 |
| 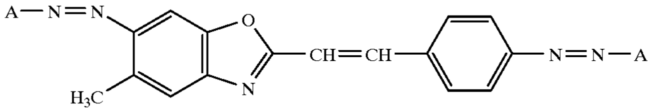 | A9-12 |

TABLE 23-continued
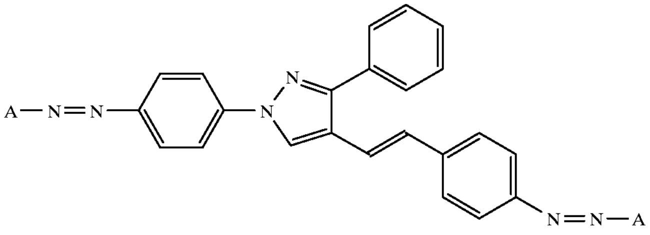
B1-12
TABLE 24
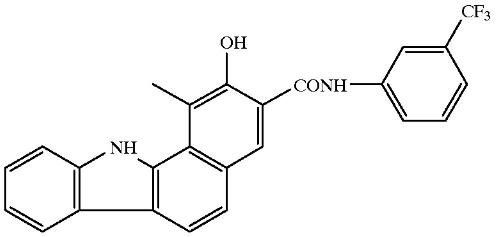
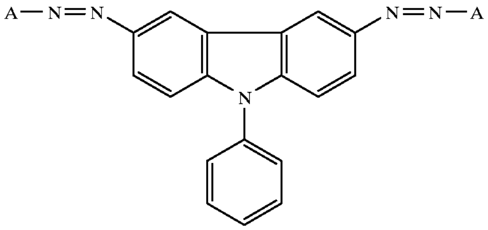
A5-13
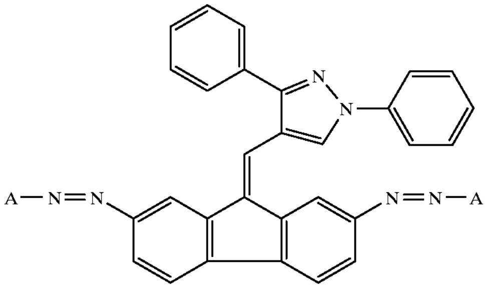
A6-13
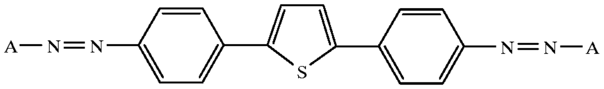
A7-13
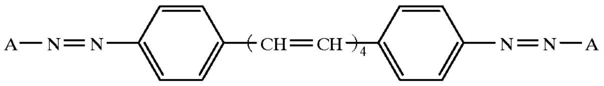
A8-13
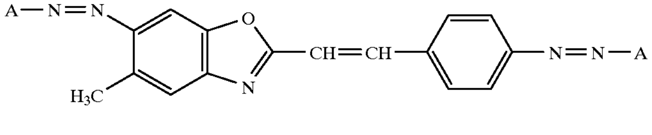
A9-13

TABLE 24-continued
| | |
|---|---|
| 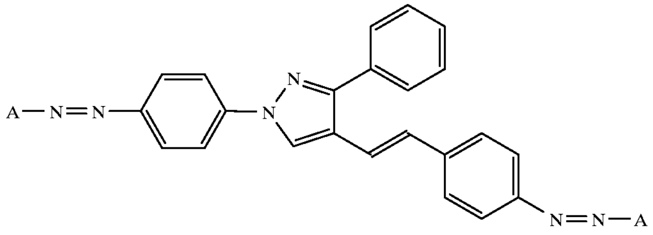 | B1-13 |
| 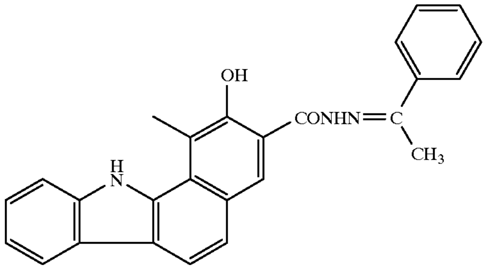 | |
| 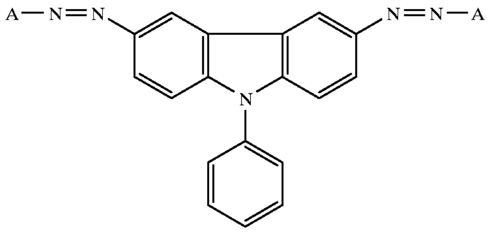 | A5-14 |
| 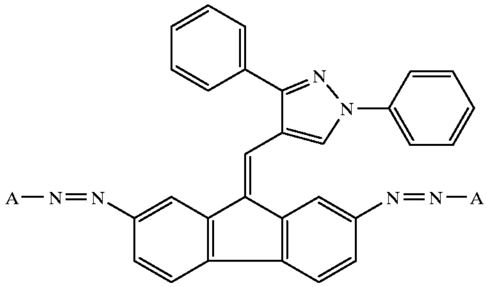 | A6-14 |
| 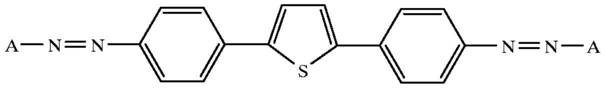 | A7-14 |
| 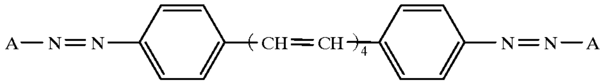 | A8-14 |
| 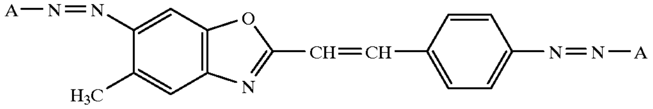 | A9-14 |

TABLE 24-continued
| | |
|---|---|
| 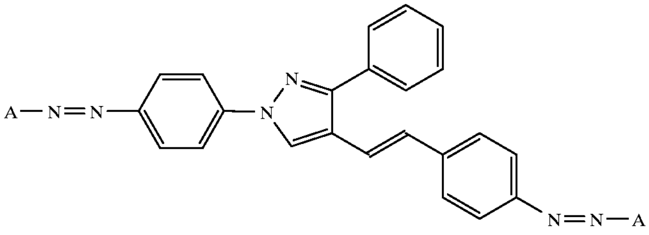 | B1-14 |
| | 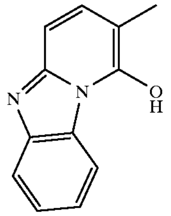 |
| 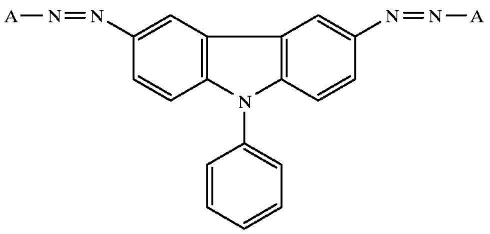 | A5-15 |
| 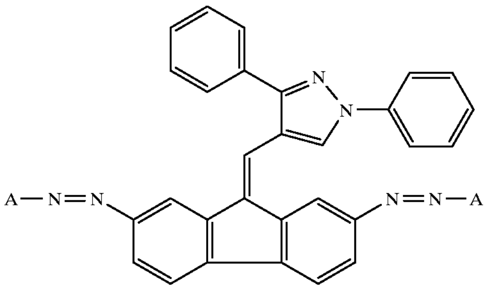 | A6-15 |
| 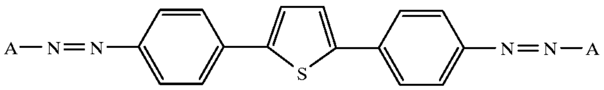 | A7-15 |
| 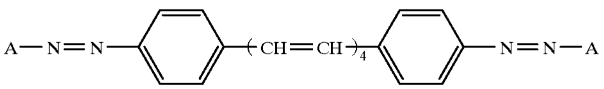 | A8-15 |
| 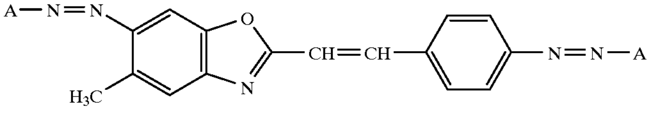 | A9-15 |

TABLE 24-continued
| | |
|---|---|
| 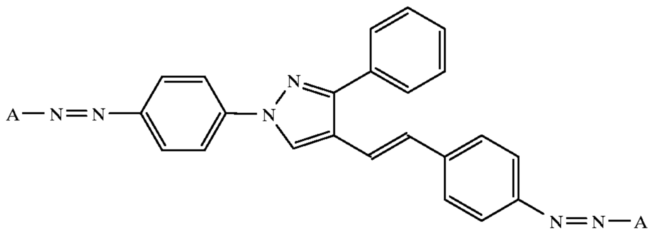 | B1-15 |
| | 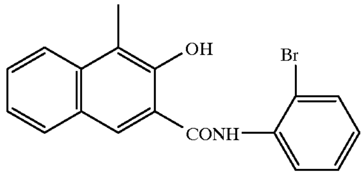 |
| 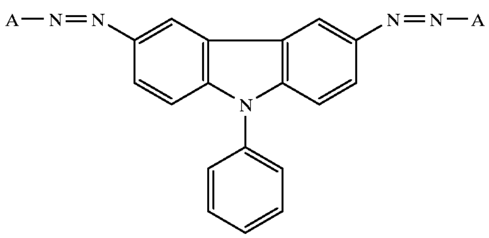 | A5-16 |
| 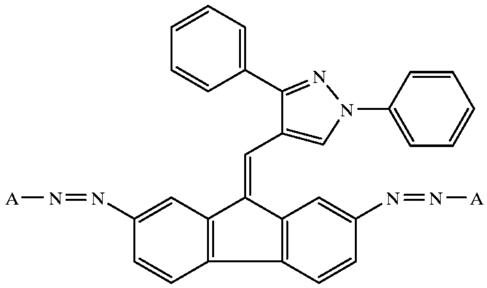 | A6-16 |
| 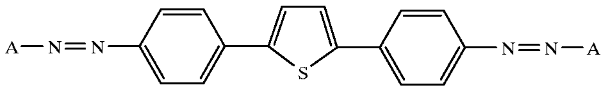 | A7-16 |
| 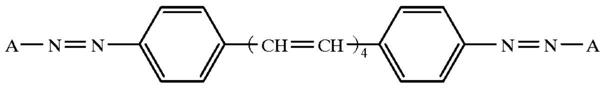 | A8-16 |
| 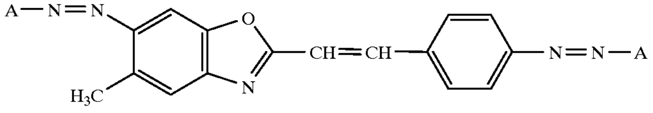 | A9-16 |

TABLE 24-continued

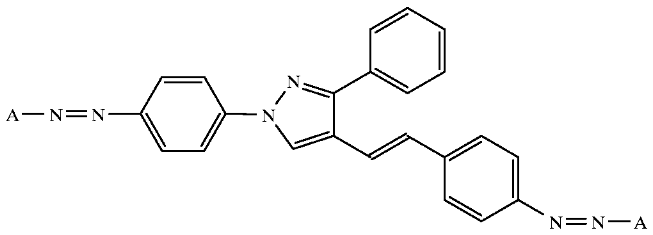

B1-16

The photoreceptors can be of various forms. One example of them comprises a conductive support and, provided thereon, a light-sensitive layer comprising a charge generation substance, a charge transport substance and a film-forming binder resin. Furthermore, a double-layered photoreceptor is known which comprises a conductive support and, provided thereon, a charge generation layer comprising a charge generation substance and a binder resin and a charge transport layer comprising a charge transport substance and a binder resin. Either of the charge generation layer and the charge transport layer may be an upper layer. Moreover, if necessary, a subbing layer may be provided between the conductive support and the light-sensitive layer, an overcoat layer may be provided on the surface of the photoreceptor, or an intermediate layer may be provided between the charge generation layer and the charge transport layer in the case of double-layered type photoreceptor. As the supports for making photoreceptors using the compounds of the present invention, there may be used metallic drums, metallic sheets, papers subjected to electroconductive treatment, sheet-like, drum-like or belt-like plastic films, and the like.

As the film-forming binder resins used for forming the light-sensitive layer on the supports, there are various resins depending on the fields where the photoreceptors are used. For example, in the case of copying photoreceptors, mention may be made of polystyrene resin, polyvinyl acetal resin, polysulfone resin, polycarbonate resin, polyester resin, polyphenylene oxide resin, polyarylate resin, acrylic resin, methacrylic resin, phenoxy resin, and the like. Among them, polystyrene resin, polyvinyl acetal resin, polycarbonate resin, polyester resin, and polyarylate resin are superior in potential characteristics as photoreceptors. These resins may be used each alone or in admixture of two or more as copolymers.

In the case of double-layered type photoreceptors, amount of these resins contained in the charge generation layer is preferably 10–500% by weight, more preferably 50–150% by weight based on the weight of the charge generation substance. If the proportion of the resin is too high, charge generating efficiency lowers, and if the proportion of the resin is too low, there is a problem in film-formability. Amount of the resins contained in the charge transport layer is preferably 20–1000% by weight, more preferably 50–500% by weight based on the weight of the charge transport substance. If the proportion of the resin is too high, sensitivity decreases, and if the proportion of the resin is too low, there may occur deterioration in characteristics on repeated use or breakage of coat.

Some of these resins are insufficient in mechanical strengths such as tensile strength, flexural strength and compression strength. Materials which impart plasticity can be added to improve these properties. Examples of these materials are phthalate esters (such as dioctyl phthalate and dibutyl phthalate), phosphate esters (such as tricresyl phosphate and trioctyl phosphate), sebacate esters, adipate esters, nitrile rubbers, and chlorinated hydrocarbons. Since these materials adversely affect the electrophotographic characteristics when added in an amount more than needed, the amount is preferably at most 20% based on the binder resin.

In addition, if necessary, additives such as antioxidant and curling inhibitor may be added to the photoreceptors.

The compound represented by the formula (I) can be used in combination with other charge transport substances. The charge transport substances include hole transport substances and electron transport substances. Examples of the former are oxadiazoles disclosed in JP-B-34-5466, triphenylmethanes disclosed in JP-B-45-555, pyrazolines disclosed in JP-B-52-4188, hydrazones disclosed in JP-B-55-42380, and oxadiazoles disclosed in JP-B-56-123544. Examples of the electron transport substances are chloranil, tetracyanoethylene, 2,4,7-trinitro-9-fluorenone, 2,4,5,7-tetranitroxanthone and 1,3,7-trinitrodibenzothiophene. These charge transport substances may be used each alone or in combination of two or more.

The present invention will be explained in more detail by the following nonlimiting examples.

EXAMPLE 1

One part by weight of an azo compound (Compound K-2 exemplified hereinbefore) and 1 part by weight of a polyester resin (BYRON 200 manufactured by Toyobo Co., Ltd.) were mixed with 100 parts by weight of tetrahydrofuran, followed by dispersing them for 2 hours together with glass beads by a paint conditioner. The resulting dispersion was coated on an aluminum-vapor deposited polyester sheet by an applicator to form a charge generation layer of about 0.2$\mu$ thick. Then, a hydrazone compound (Compound (5) exemplified hereinbefore) was mixed with a polyarylate resin (U-POLYMER manufactured by Unitika, Ltd.) at a weight ratio of 1:1. The mixture was dissolved in dichloroethane as a solvent to prepare a 10% solution. This solution was coated on the charge generation layer by an applicator to form a charge transport layer of about 20 $\mu$ thick.

Thus obtained double-layered type photoreceptor was evaluated on electrophotographic characteristics by an electrostatic recording paper testing apparatus (SP-428 manufactured by Kawaguchi Electric Mfg. Co., Ltd.).

Measuring conditions: Applied voltage −6 kV, Static No.3 (turning speed of turn table: 10 m/min).

As a result, the charging potential $V_0$ was −794 V and the half decay exposure $E_{1/2}$ was 0.8 lux.sec. Thus, the sensitivity was high.

Furthermore, the photoreceptor was evaluated on characteristics for repeated use [1 cycle consisting of charging-discharging (discharging light: exposure with white light of 400 lux for 1 second)]. Change of charging potential after repetition of 5000 times was examined to find that the initial potential $V_0$ at the 1st time was −794 V and the initial potential $V_0$ at the 5000th time was −783 V, and thus reduction of potential due to repeated use was small and the potential was stable. Furthermore, the half decay exposure $E_{1/2}$ at the 1st time was 0.8 lux.sec and the half decay exposure $E_{1/2}$ at the 5000th time was 0.9 lux.sec, and thus there was substantially no change.

EXAMPLES 2–9

Photoreceptors were produced in the same manner as in Example 1, except that the compounds shown in Table 25 were used in place of the azo compound and the hydrazone compound used in Example 1. The characteristics were evaluated in the same manner as in Example 1. The results are shown in Table 25.

TABLE 25

| | Compounds | | | | | |
|---|---|---|---|---|---|---|
| | Azo | Compound of formula | The first measurement | | The 5000th measurement | |
| Example | compound | (I) | $V_0$(V) | $E_{1/2}$* | $V_0$(V) | $E_{1/2}$* |
| 2 | K-2 | (6) | −783 | 0.8 | −769 | 0.9 |
| 3 | K-L | (5) | −809 | 0.9 | −798 | 1.0 |
| 4 | H-1 | (6) | −872 | 0.7 | −865 | 0.6 |
| 5 | I-1 | (5) | −810 | 0.6 | −802 | 0.8 |
| 6 | J-1 | (5) | −779 | 0.8 | −764 | 0.9 |
| 7 | A-1 | (1) | −835 | 1.0 | −803 | 1.1 |
| 8 | A6-3 | (28) | −814 | 1.2 | −795 | 1.2 |
| 9 | R-7 | (14) | −828 | 1.1 | −805 | 1.4 |

*: (lux · sec)

EXAMPLE 10

One part by weight of an azo compound (Compound K-2 exemplified hereinbefore) and 40 parts by weight of tetrahydrofuran were dispersed for 4 hours together with glass beads by a paint conditioner. To the resulting dispersion were added 2.5 parts by weight of a hydrazone compound (Compound (5) exemplified hereinbefore), 10 parts by weight of a polycarbonate resin (PCZ-200 manufactured by Mitsubishi Gas Chemical Company, Inc.) and 60 parts of tetrahydrofuran, followed by further dispersing for 30 minutes by a paint conditioner. Then, the resulting dispersion was coated on an aluminum-vapor deposited polyester sheet by an applicator to form a photoreceptor of about 15$\mu$ in film thickness. Electrophotographic characteristics of this photoreceptor were measured in the same manner as in Example 1, except that only the applied voltage was changed to +5 kV. As a result, the initial potential $V_0$ at the 1st time was +452 V and the half decay exposure $E_{1/2}$ at the 1st time was 1.2 lux.sec, and the initial potential $V_0$ after repetition of 5000 times was +440 V, and the half decay exposure $E_{1/2}$ after repetition of 5000 times was 1.1 lux.sec. Thus, the photoreceptor showed excellent characteristics of high sensitivity and less change in potential.

EXAMPLES 11–18

Photoreceptors were produced in the same manner as in Example 10, except that the compounds shown in Table 26 were used in place of the azo compound and the hydrazone compound used in Example 10. The characteristics were evaluated in the same manner as in Example 10. The results are shown in Table 26.

TABLE 26

| | Compounds | | | | | |
|---|---|---|---|---|---|---|
| | Azo | Compound of formula | The first measurement | | The 5000th measurement | |
| Example | compound | (I) | $V_0$(V) | $E_{1/2}$* | $V_0$(V) | $E_{1/2}$* |
| 11 | K-2 | (6) | 420 | 1.1 | 412 | 1.0 |
| 12 | K-1 | (5) | 452 | 1.2 | 449 | 1.1 |
| 13 | H-1 | (6) | 440 | 1.1 | 428 | 1.2 |
| 14 | I-1 | (5) | 417 | 1.0 | 400 | 1.2 |
| 15 | J-1 | (5) | 409 | 1.1 | 399 | 1.3 |
| 16 | A-1 | (1) | 418 | 1.4 | 410 | 1.5 |
| 17 | A6-3 | (28) | 403 | 1.5 | 389 | 1.3 |
| 18 | R-7 | (14) | 400 | 1.4 | 388 | 1.5 |

*: (lux · sec)

COMPARATIVE EXAMPLE 1

Photoreceptor was produced in the same manner as in Example 1, except that azo compound (Compound A-1 exemplified hereinbefore) was used as the charge generation and the following Compound (A) was used as the charge transport substance. The characteristics were evaluated in the same manner as in Example 1. The initial potential $V_0$ at the 1st time was −626 V and the half decay exposure $E_{1/2}$ at the 1st time was 1.7 lux.sec. Thus, relatively good results were obtained, but the initial potential Vo at the 5000th time was −310 V, and the half decay exposure $E_{1/2}$ at the 5000th time was 1.6 lux.sec. Thus, a considerable reduction of potential due to repetition was seen.

COMPARATIVE EXAMPLE 2

Photoreceptor was produced in the same manner as in Example 11, except that azo compound (Compound A-1 exemplified hereinbefore) was used as the charge generation substance and the following Compound (B) was used as the charge transport substance. The characteristics were evaluated in the same manner as in Example 11. The initial potential $V_0$ was 290 V and the half decay exposure $E_{1/2}$ was 6.7 lux.sec. Thus, sensitivity was insufficient.

(A)

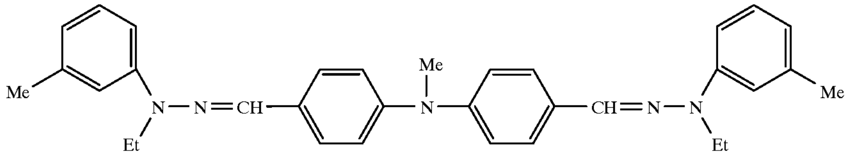

-continued

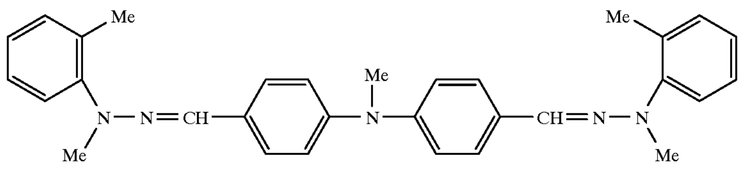

(B)

As is clear from the above explanation, the present invention provides electrophotographic photoreceptors of high sensitivity and high endurance.

What is claimed is:

1. An electrophotographic photoreceptor which comprises a conductive support and, provided thereon, a light-sensitive layer containing a hydrazone compound represented by the following formula (I):

(I)

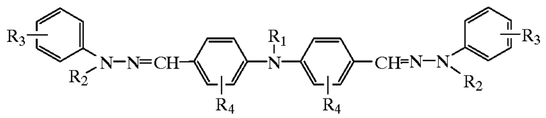

wherein $R_1$ represents an alkyl group of 5 or more carbon atoms, $R_2$ represents a substituted or unsubstituted alkyl group, aralkyl group, aryl group or heterocyclic group, and $R_3$ and $R_4$ each represent a hydrogen atom, an alkyl group, an alkoxy group or a halogen atom.

2. An electrophotographic photoreceptor according to claim 1, wherein $R_1$ in the formula (I) representing the hydrazone compound is an alkyl group of 5–8 carbon atoms.

3. An electrophotographic photoreceptor according to claim 1, wherein $R_1$ in the formula (I) representing the hydrazone compound is n-hexyl group.

4. An electrophotographic photoreceptor according to claim 1, wherein $R_1$ is n-hexyl group, $R_2$ is methyl group or phenyl group, and $R_3$ and $R_4$ are hydrogen atoms in the formula (I) representing the hydrazone compound.

5. An electrophotographic photoreceptor according to claim 1, wherein the light-sensitive layer comprises a charge generation layer and a charge transport layer, said charge transport layer containing the compound represented by the formula (I).

* * * * *